US008007589B2

(12) United States Patent
Hwang et al.

(10) Patent No.: US 8,007,589 B2
(45) Date of Patent: Aug. 30, 2011

(54) APPARATUS AND METHOD FOR COMPOUNDING CARBON NANOTUBES

(75) Inventors: Ho-Soo Hwang, Suwon-si (KR); Sung-Soo Kim, Chungcheongbuk-do (KR); Suk-Min Choi, Seoul (KR); Jin-Tae Hwang, Hwaseong-si (KR); Suk-Won Jang, Seoul (KR); Hyung-Suk Kim, Suwon-si (KR); Byung-Yun Kong, Hwaseong-si (KR)

(73) Assignee: Semes Co., Ltd., Chungcheongnam-do (KR)

( * ) Notice: Subject to any disclaimer, the term of this patent is extended or adjusted under 35 U.S.C. 154(b) by 624 days.

(21) Appl. No.: 11/640,381

(22) Filed: Dec. 18, 2006

(65) Prior Publication Data

US 2007/0231246 A1 Oct. 4, 2007

(30) Foreign Application Priority Data

Dec. 16, 2005 (KR) ........................ 10-2005-0124674
Dec. 16, 2005 (KR) ........................ 10-2005-0124675
Jan. 5, 2006 (KR) ........................ 10-2006-0001240
Jan. 5, 2006 (KR) ........................ 10-2006-0001241

(51) Int. Cl.
*C23C 16/00* (2006.01)
(52) U.S. Cl. ........................................ 118/715; 977/843
(58) Field of Classification Search ................... 118/715
See application file for complete search history.

(56) References Cited

U.S. PATENT DOCUMENTS 5,507,639 A * 4/1996 Monoe ............................ 432/77
5,925,188 A * 7/1999 Oh ................................ 118/715
2003/0091753 A1* 5/2003 Han et al. ....................... 427/569
2003/0136425 A1 7/2003 Murugesh et al.
2005/0092245 A1* 5/2005 Moon et al. ................... 118/715
2005/0223986 A1 10/2005 Choi et al.
2006/0042544 A1* 3/2006 Hasebe et al. ................ 118/715

FOREIGN PATENT DOCUMENTS

CN 1282801 A 2/2001
EP 1072693 A1 * 1/2001
JP 03142823 A * 6/1991
JP 2004-217511 8/2004
JP 2007-091481 4/2007
JP 2007-091485 4/2007
KR 10-2004-0002439 1/2004
KR 1020040002439 1/2004

OTHER PUBLICATIONS

Official English Translation of JP 03-142823 to Tsukune. Translated by Schreiber Translations, Inc. Jun. 2010.*

* cited by examiner

*Primary Examiner* — Maureen Gramaglia
(74) *Attorney, Agent, or Firm* — Harness, Dickey & Pierce, P.L.C.

(57) ABSTRACT

Apparatus and method for compounding carbon nanotubes are provided to uniformly supply a source gas used to compound carbon nanotubes, efficiently exhaust the source gas, and increase a retrieve rate of the carbon nanotubes. According to the apparatus and method, carbon nanotubes are massively compounded.

11 Claims, 19 Drawing Sheets

APPARATUS AND METHOD FOR COMPOUNDING CARBON NANOTUBES

PRIORITY STATEMENT

This U.S. non-provisional patent application claims priority under 35 U.S.C. §119 of Korean Patent Application Nos. 10-2005-0124674 filed on Dec. 16, 2005, 10-2005-0124675 filed Dec. 16, 2005, 10-2006-0001240 filed Jan. 5, 2006 and 10-2006-0001241 filed Jan. 5, 2006, the entire contents of which are hereby incorporated by reference.

TECHNICAL FIELD OF THE INVENTION

The present invention relates to apparatus and method for compounding carbon nanotubes and, more specifically, to apparatus and method for mass production of carbon nanotubes.

BACKGROUND OF THE INVENTION

Carbon nanotubes are hollow cylinders of carbon atoms. Their appearance is that of rolled tubes of graphite, such that their walls are hexagonal carbon rings, and they are often formed in large bundles. The ends of carbon nanotubes are domed structures of six-membered rings, capped by a five-membered ring.

With the possession of metallic conductivity and semiconductor conductivity according to structures, carbon nanotubes are now top candidate to be applied to various technological fields such as, for example, electrodes of electrochemical storage devices (e.g., secondary cells or supercapacitors or fuel cell), electromagnetic shielding, field emission displays or gas sensors.

Generally, the production amount of carbon nanotubes (CNTs) is small because hands are still in charge of performing many their production steps including a step of loading/unloading a CNT-compounded substrate on/from a reaction tube and a step of unloading the substrate from the reaction tube to retrieve a CNT therefrom. Hence, it is difficult to perform successive process and mass production of carbon nanotubes.

Larger diameters of reaction tubes are necessary for mass production of carbon nanotubes. For this reason, multi-stage/multi-column boats have been required. However, a multi-stage/multi-column boat has a great deviation in gas density (gas density at front and rear columns of the boat and gas density at upper and lower stages of the boat) according to the positions of composite substrates. Generally, source gas flows down to the bottom of a reaction tube because it is heavy. Thus during a process, the source gas is excessively concentrated on a composite substrate disposed on a front-column lower stage while a relatively small amount of source gas is supplied to a composite substrate disposed on a rear-column upper stage. As a result, the entire productivity of carbon nanotubes decreases.

Since hydrogen-containing source gases (noxious/explosive gases) are mainly used to compound carbon nanotubes, it is necessary to eliminate residual gases inside a reaction tube. Unless source gases inside the reaction tube are fully exhausted after compounding carbon nanotubes, a noxious gas (hydrogen) among residual gas elements inside the reaction tube may be leaked to the air and react to oxygen to be exploded. Especially, a possibility of accident resulting from residual gases may continue to increase with the recent trend toward larger diameters of reaction tubes.

As diameters of reaction tubes become larger and the number of composite substrates required in a process is increasing, gas density deviation based on the positions of composite substrates (substrates disposed at a front column and a rear column) becomes higher. The gas density deviation leads to deterioration in efficiency of a process for compounding carbon nanotubes that are sensitive to a gas uniformity. Further, carbon nanotubes fall on the bottom inside a reaction tube while retrieving composite substrates compounded from the reaction tube. The carbon nanotubes remaining at the reaction tube result in contamination of the interior of the reaction tube and malfunction of a robot provided for transferring composite substrates and have an adverse effect on the flow of source gases.

SUMMARY OF THE INVENTION

Exemplary embodiments of the present invention are directed to an apparatus for compounding carbon nanotubes. In an exemplary embodiment, the apparatus may include a reaction tube configured to define a production space in which carbon nanotubes are produced; a heating unit configured to heat the reaction tube; a boat, disposed the production space during a process, on which composite substrates are loaded; and a gas supply part with a nozzle unit configured to supply a source gas to the production space, the nozzle unit including injection parts configured to supply source gases at different heights.

Exemplary embodiments of the present invention are directed to a method for compounding carbon nanotubes. In an exemplary embodiment, the method may include loading a composite substrate to an inner space of a reaction tube; eliminating oxygen remaining inside the reaction tube; supplying a source gas into the reaction tube to compound a carbon nanotube on a surface of the composite substrate; and opening the reaction tube to unload the composite substrate where the carbon nanotube is compounded, wherein the source gas is injected at different heights inside the reaction tube, enabling reach distances of the injected source gas to be different inside the reaction tube.

DETAILED DESCRIPTION OF PREFERRED EMBODIMENTS

Figure 1:
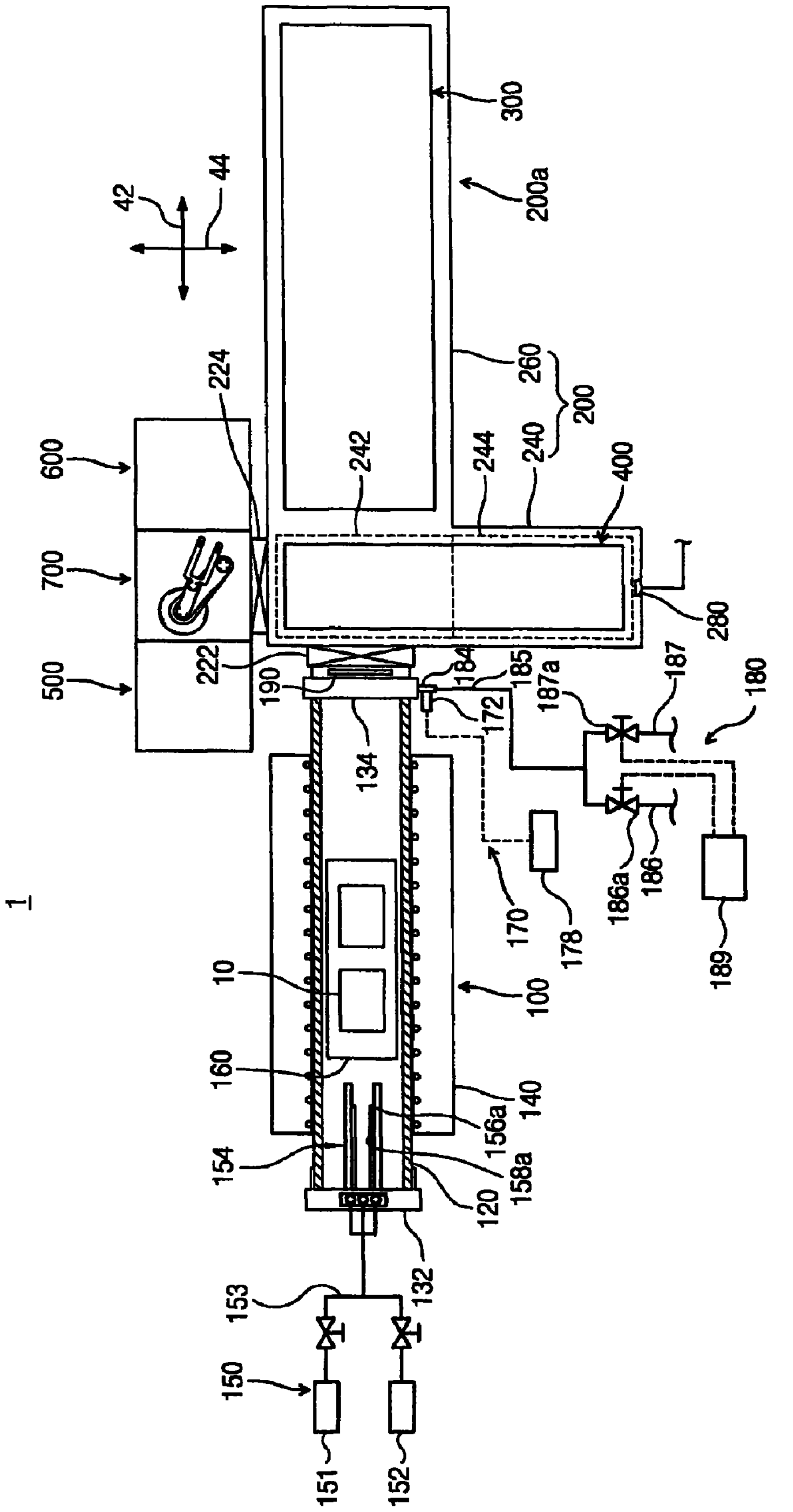
FIG. 1 illustrates a system for producing a carbon nanotube.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, the thicknesses of layers and areas are exaggerated for clarity. Like numbers refer to like elements throughout.

An exemplary apparatus 1 for compounding carbon nanotubes (hereinafter referred to as "CNT compounding apparatus") is illustrated in FIG. 1. The CNT compounding apparatus 1 includes a composite substrate 10, a carbon nanotube compounding chamber (hereinafter referred to as "reaction chamber") 100, and a pre/post processing chamber.

The composite substrate 10 is a base plate where a carbon nanotube is compounded. The composite substrate 10 may be a silicon wafer, an indium tin oxide (ITO) substrate, an ITO-coated glass, a soda lime glass, a Corning glass, and alumina. Nonetheless, other materials may be used as a composite substrate if they have a strength enough to compound (grow, produce) a carbon nanotube.

The reaction chamber 100 is provided to perform a process of producing a carbon nanotube on the composite substrate 10. The pre/post processing chamber is provided to perform a pre-treating process and a post-treating process for the composite substrate loaded/unloaded on/from the reaction chamber 100. The pre-treating process and the post-treating process include a process of coating a catalyst 20 on a composite substrate and a process of retrieving a carbon nanotube formed over the composite substrate. The pre/post processing chamber includes a station part 200, a first transporter 300, a substrate accommodating part 400, a catalyst coating part 500, a retrieve part 600, and a second transporter 700.

The station part 200 is disposed at one side of the reaction chamber 100 to be juxtaposed with the reaction chamber 100. The station part 200 includes a first area 240 and a second area 260. The first area 240 is disposed adjacent to the reaction chamber 100, and the second area 260 is disposed opposite to the reaction chamber 100 on the basis of the first area 240. The substrate accommodating part 400 is disposed in the first area 400, and the first transporter 300 is disposed in the second area 260. The reaction chamber 100 and the second area 260 are collinearly disposed in a first direction 42. The first area 240 is divided into an upper area 242 and a lower area 244. The upper area 242 is disposed to be collinear with the reaction chamber 100 and the second area 260, and the lower area 244 extends from the upper area 244 in a second direction 44 perpendicular to the first direction 42. Both the first area 240 and the second area 260 take the shape of rectangle.

The first transporter 300 is provided to load/unload a composite substrate to/from the reaction chamber 100. The substrate accommodating part 400 is configured to store a substrate loaded/unloaded to/from the reaction chamber 100. The catalyst coating part 500 is provided to coat a catalyst 20 on the composite substrate 10 before the composite substrate 10 is loaded to the reaction chamber 100. The retrieve part 600 is configured to retrieve a carbon nanotube 30, produced on the composite substrate 10 unloaded from the reaction chamber 100, from the composite substrate 10. The second transporter is provided to transport the composite substrate 10 between the substrate accommodating part 400 and the catalyst coating part 500 and between the substrate accommodating part 400 and the retrieve part 600.

The catalyst coating unit 500, the retrieve part 600, and the second transporter 400 are disposed adjacent to the station part 200. The catalyst coating part 500, the retrieve part 600, and the second transporter 400 are juxtaposed at a position, which is opposite to the lower area 244 of the first area 240 on the basis of the upper area 242, in a direction parallel with the first direction 42. The second transporter 400 is disposed between the catalyst coating part 500 and the retrieve part 600.

The components of the system according to the invention will now be described in detail below.

As illustrated in FIG. 1, the reaction chamber 100 includes a reaction tube 120, a heating unit 140, a gas supply unit 150, a boat 160, a residual gas detection unit 170, a gas exhaust unit 180, and a heat blocking member 190. The reaction tube 120 is made of a heatproof material such as quartz or graphite. In general, the reaction tube 120 takes a cylindrical shape. A flange 132 is installed at the front end of the reaction tube 120 to seal the interior of the reaction tube 120, and a flange 134 is installed at the rear end of the reaction tube 120 to connect a gate valve 222 with the reaction tube 120.

Figure 2:
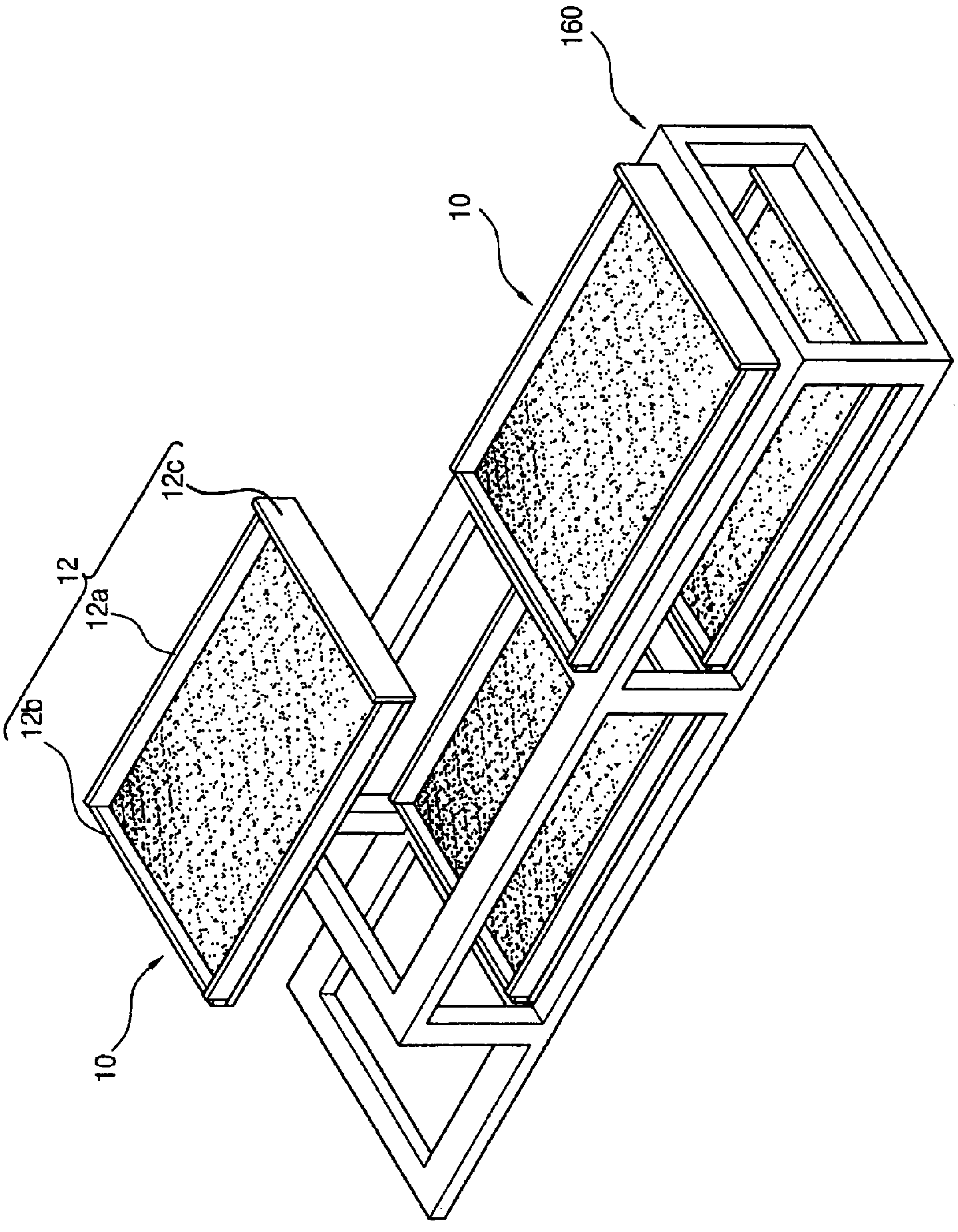
FIG. 2 is a perspective view of a boat and a composite substrate according to the present invention.

As illustrated in FIG. 2, the boat 160 takes a double-layered structure where composite substrates 10 are placed on multiple stages. At least one boat 160 is provided inside the reaction tube 120 during a process. For example, a plurality of composite substrates 10 are placed on one boat 160 in a first direction 42 of the reaction tube 120. Optionally, a boat 160 may be sized and structured lengthwise and crosswise to support each of composite substrates 10. That is, boats 160 are sized and structured crosswise to support two composite substrates 10 and lengthwise to support two composite substrates 10. Alternatively, boats 160 may be fixedly installed inside the reaction tube 120.

A fence 12 having a predetermined height is formed along the edge of a composite substrate 10. The fence 12 includes first to third sidewalls 12*a*, 12*b*, and 12*c*. The first sidewall 12*a* is formed at opposite sides of a composite substrate 10 which are parallel with a gas inflow direction. The second sidewall 12*b* is formed in the front part of the composite substrate 10 which is perpendicular to the gas inflow direction. The third sidewall 12*c* is formed at the back part of the composite substrate 10 which is perpendicular to the gas inflow direction. The second sidewall 12*b* is higher than the first sidewall 12*a*. The third sidewall 12*c* is higher than the first sidewall 12*a* and the second sidewall 12*b*. Since the first sidewall 12*a* has a slight effect on a gas flow, it may be somewhat higher than the first sidewall 12*b* and the third sidewall 12*c*. It is noted that if the second sidewall 12*b* is higher than the first sidewall 12*a*, vortex may be generated on the top surface of a composite substrate 10 to prevent a gas from flowing uniformly.

The fence 12 of a composite substrate 10 is formed to prevent a carbon nanotube 30 grown at the composite substrate 10 from falling apart from the composite substrate 10. Especially, the second sidewall 12*b* and the third sidewall 12*c* of the fence 12 change the flow of a source gas flowing to the composite substrate such that more amount of the source gas flows to a composite substrate disposed at a rear column. Namely, a horizontally flowing source gas collides partly against the second sidewall 12*b* to curvedly migrate to the upper side of the composite substrate 10 before being induced to the upper side of the composite substrate 10. A part of the source gas reacts to a catalyst coated on a composite substrate 10 disposed at a front column while flowing to the upper side of the composite substrate 10, compounding a carbon nanotube. The non-reacting source gas collides against the third sidewall 12*c*, while migrating to the upper side of a composite substrate disposed at a front column, before reaching the composite substrate disposed at the rear column. The composite substrate 10 is provided to form a fence 12. Due to the fence 12, the flow of a source gas is controlled to enable more amount of the source gas to flow to the composite substrate disposed at the rear column.

In another exemplary embodiment, a boat 160 may be sized to support one composite substrate 10. In this case, one or more boats 160 may be provided. When a plurality of boats 160 are provided, they may be arranged in a first direction 42 of a reaction tube 120 or stacked in an up-down direction perpendicular to the first direction 42.

Returning to FIG. 1, the heating unit 140 heats the reaction chamber 120 to a process temperature. The heating unit 140 includes an adiabatic wall 142 and a hot wire 144. The adiabatic wall 142 is installed to surround the outer wall of the reaction tube 120, and the hot wire 142 is provided inside the adiabatic wall 142 with the shape of coil. During a process, the heating unit 140 heats the reaction tube 120 to maintain an inner temperature f the reaction tube 120 at a temperature ranging from 500 to 1100 degrees centigrade (process temperature).

The gas supply unit 150 includes a source gas source 151, an inert gas (argon or nitrogen) source 152, a supply line 153, and a nozzle unit 154. The nozzle unit 154 is installed at the flange 132, supplying a gas into the reaction tube 120 through a port formed at the flange 132. As a reaction tube 120 and a boat 160 are increasing in size, gas diffusion and concentration at all sections of the reaction tube become significant. In this regard, the nozzle unit 154 has configuration characteristics which will be described below.

Figure 3:
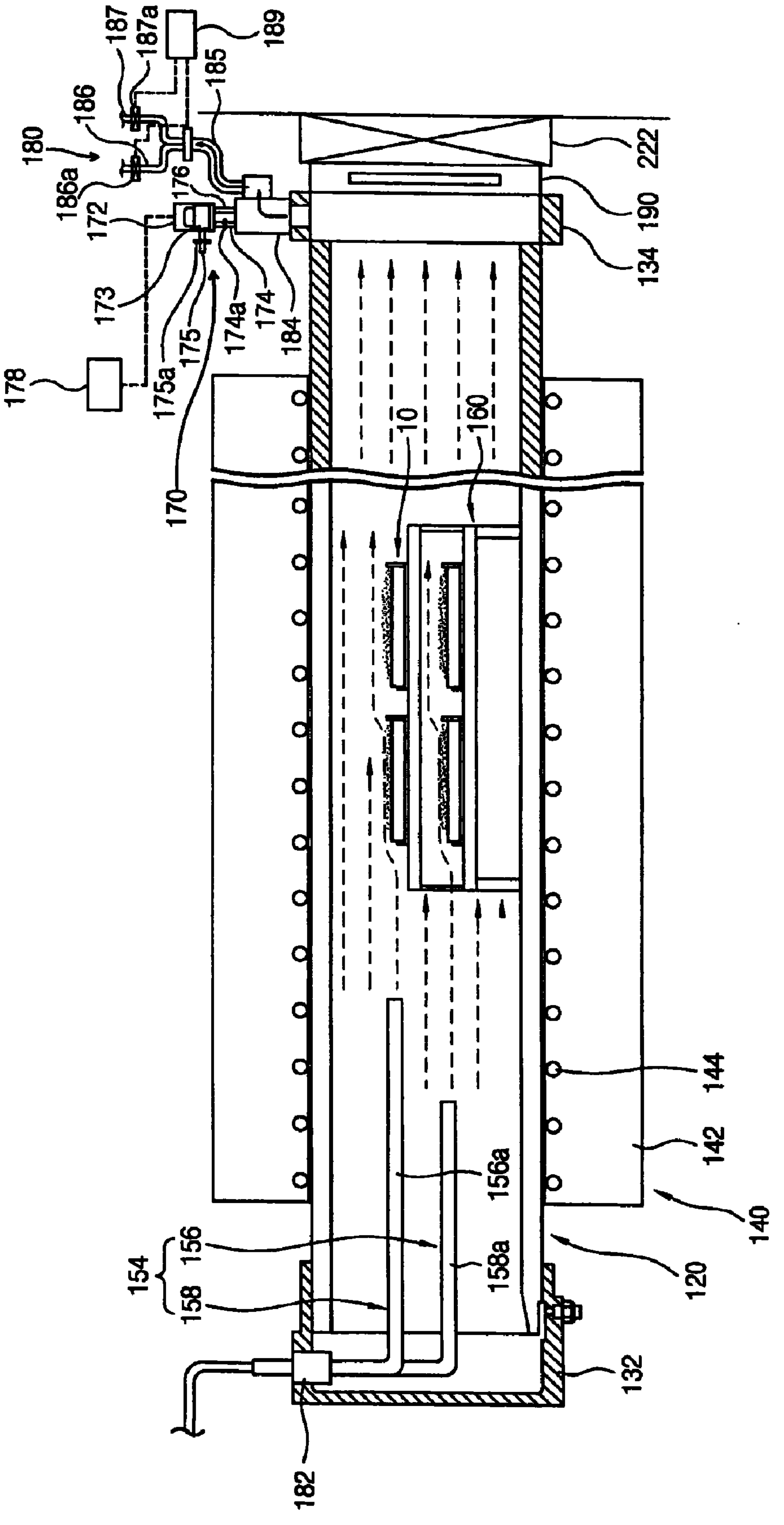
FIG. 3 and FIG. 4 illustrate the flow of a source gas inside a reaction chamber.
Figure 4:
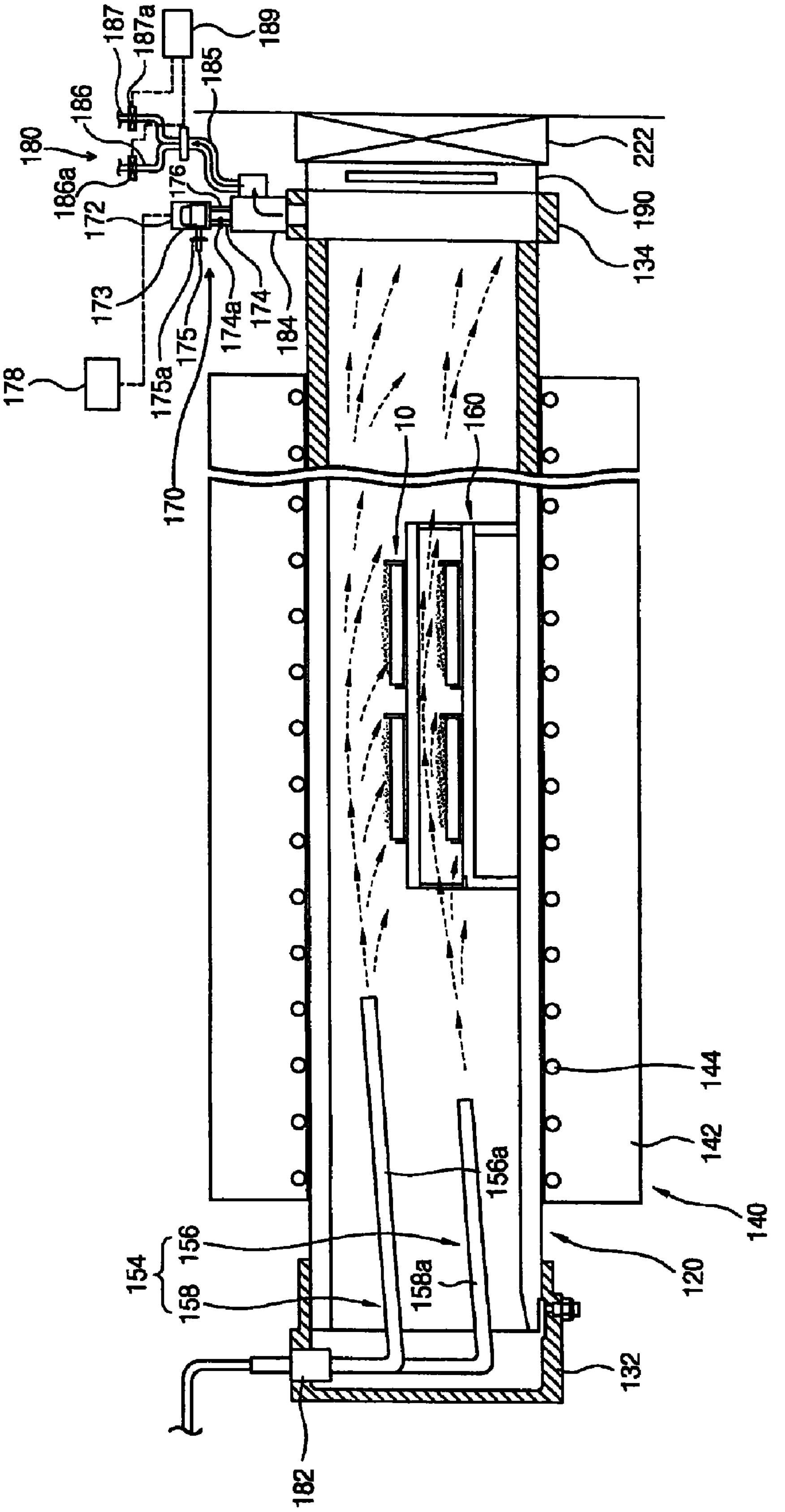
Figure 5:
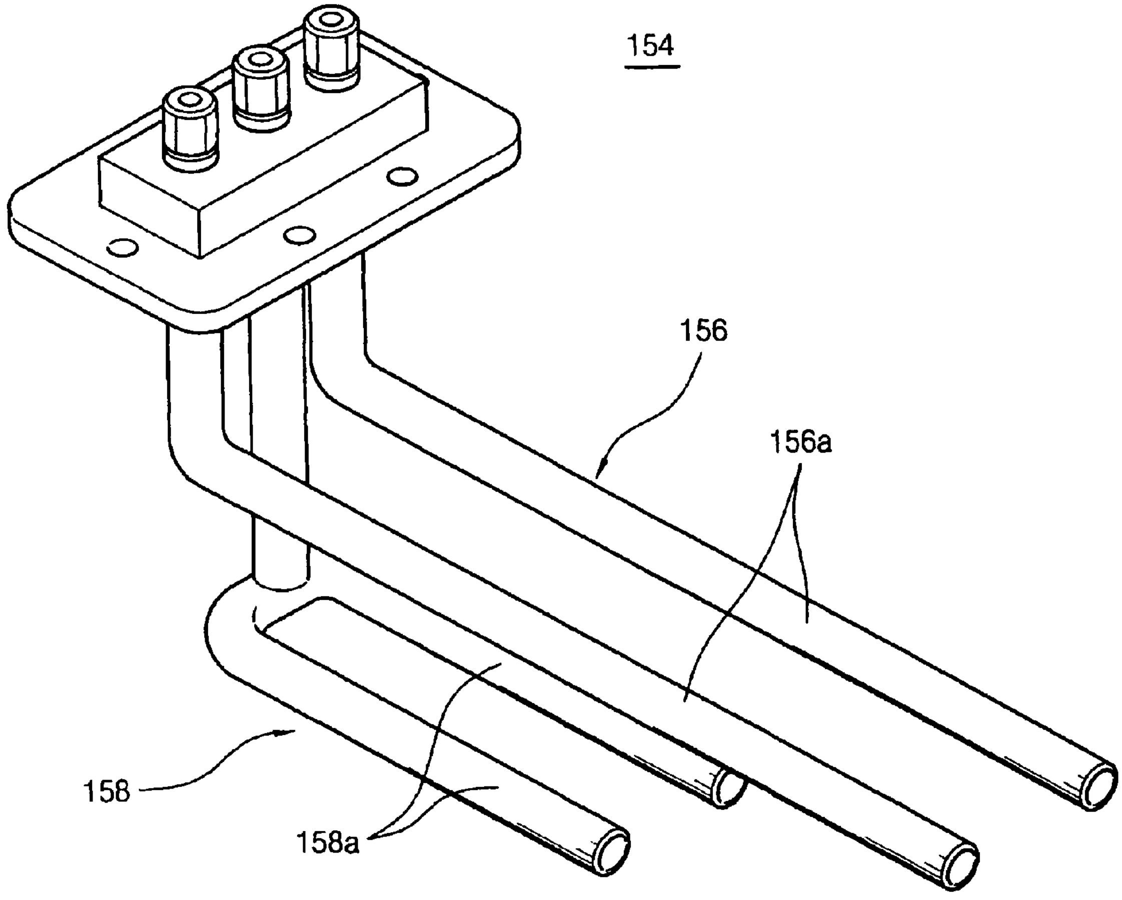
FIG. 5 is a perspective view of a nozzle unit illustrated in FIG. 3.

As illustrated in FIG. 3 through FIG. 5, the nozzle unit 154 includes first and second injection parts 156 and 158 configured to supply source gases at different heights. The first injection part 156 is disposed to be higher than the boat 10, and the second injection part 158 is disposed to be lower than the first injection part 156. The first injection part 156 includes long nozzle 156*a* each taking the shape of a long pipe and being installed adjacent to the boat 160 inside the reaction tube 120. The second injection part 158 includes medium nozzles 158*a* each taking the shape of a pipe shorter than the long nozzle 156*a*.

As illustrated with a dotted line of FIG. 4, a long nozzle 156*a* and a medium nozzle 158*a* may be installed to have an upwardly bent injection angle. In a case where each of the long and medium nozzles 156*a* and 158*a* may have an upwardly bent injection angle, a source gas may be supplied curvedly to a rear column of the boat 160. Thus, a nozzle unit 154 having such a multi-stage structure may efficiently cope with uniform gas diffusion and uniform gas concentration distribution at a large-sized reaction tube.

Figure 6:
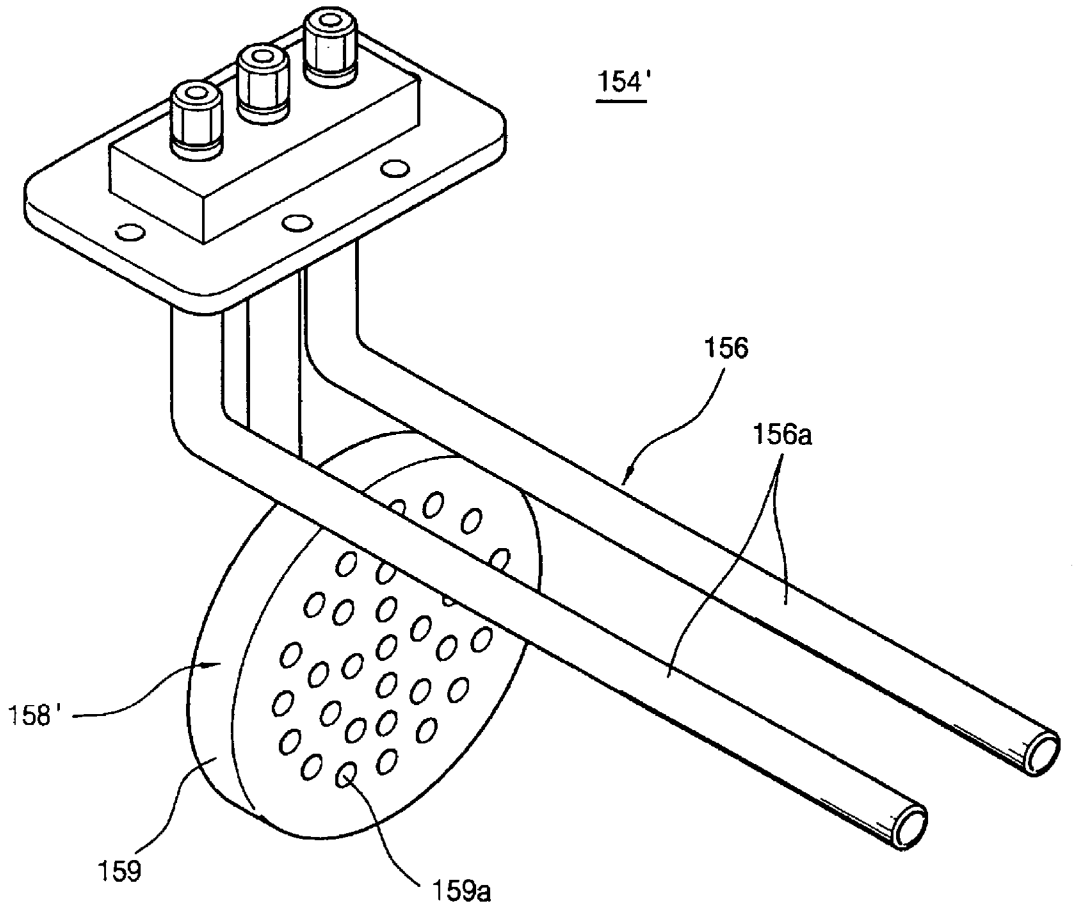
FIG. 6 is a perspective view of a modified nozzle unit.
Figure 7:
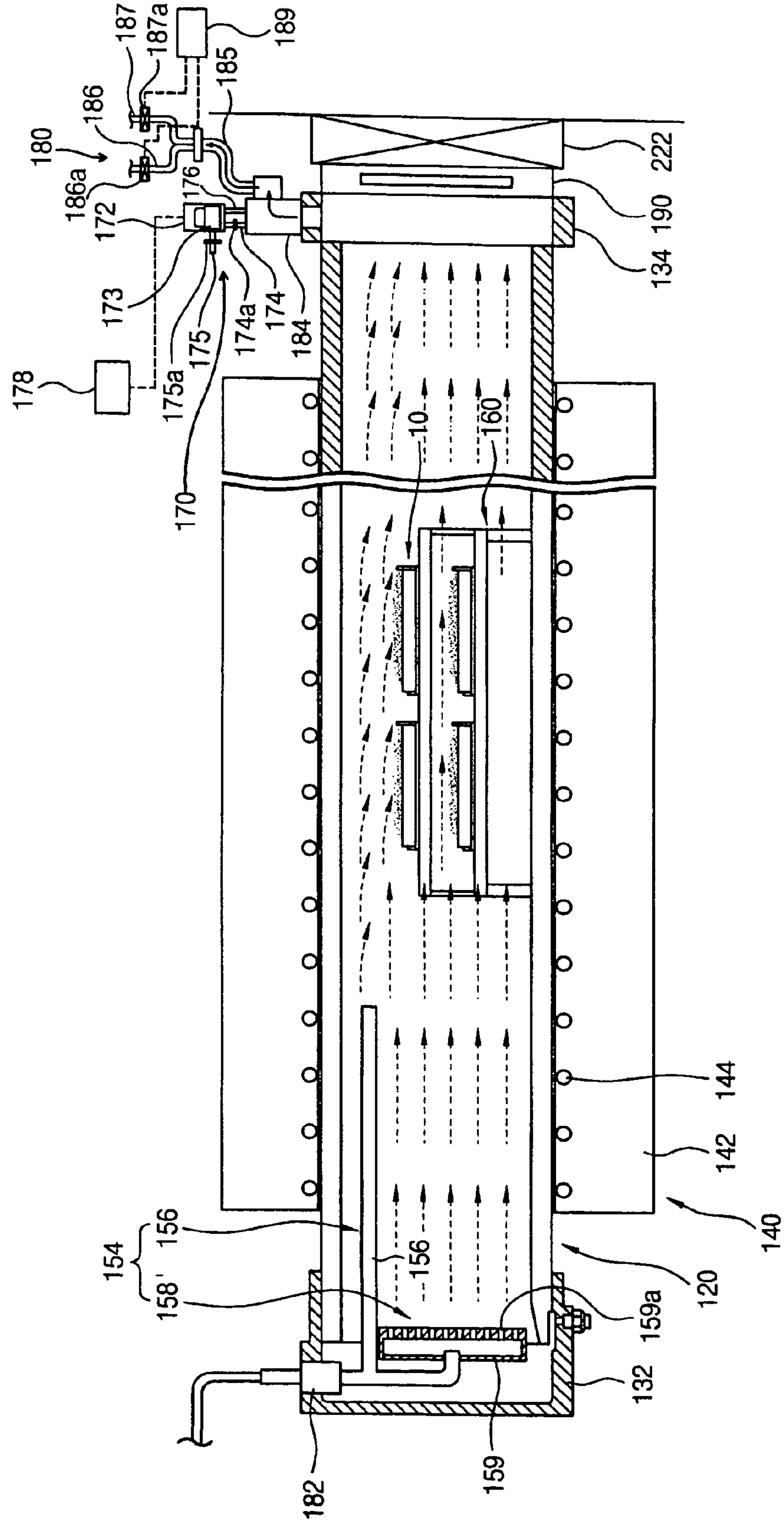
FIG. 7 illustrates the flow of a source gas through the modified nozzle unit illustrated in FIG. 6.

Shape, number, length, and injection angle of the nozzle unit 154 are variable with size of the reaction tube 120 as well as position and number of composite substrates 10 disposed at the boat 160. Other exemplary embodiments of the invention will now be described with reference to FIG. 6 and FIG. 7. As illustrated, a nozzle unit 154' includes a first injection part 156 and a second injection part 158'. The first injection part 156 is disposed to be higher than a boat 10, and the second injection part 158' is disposed below the first injection part 156. The first injection part 156 includes long nozzles 156*a* each having the same configuration as the foregoing long nozzle 156*a*, and the second injection part 158' includes a shower head 159. The shower head 159 is provided to uniformly diffuse a source gas throughout a reaction tube 120. A plurality of injection holes 159*a* are formed at the front surface of the shower head 159. Each of the injection holes 159*a* is formed to uniformly supply a source gas throughout the reaction tube 120 during a process. The source gas may be at least one selected from the group consisting of acetylene, ethylene, methane, benzene, xylene, carbon monoxide, and carbon dioxide. The source gas is thermally decomposed into radicals, which react to a catalyst coated on a composite substrate 10 to compound a carbon nanotube.

The residual gas detection unit 170 is provided to detect a residual source gas, especially hydrogen gas, inside the reaction tube 120. The residual gas detection unit 170 includes a gas detector 172 and a detection controller 178. The gas detector 172 includes a detection part 173, first and second suction ports 174 and 175, and an exhaust port 176. The detection part 173 includes at least one sensor configured to detect a concentration of hydrogen gas. The first and second suction ports 174 and 175 are provided to suck a detection-target gas passing the detection part 173 therein. The first suction port 174 is installed to connect with a gas exhaust duct 184 of the gas exhaust unit 180, and the second suction port 175 is installed to suck outside air therein. The exhaust port 176 is installed to exhaust the detection-target gas.

A pressure is applied to the gas detector 172 for continuously sucking a gas therein. Therefore, the gas detector 172 handles valves 174*a* and 174*b* installed on the first and second suction ports 174 and 175 to detect a residual gas inside the reaction tube 120 only during required steps. For example, the second suction port 175 is opened to flow in a gas (air) outside the reaction tube 120 during a process and the first suction port 174 is opened to detect a residual gas inside the reaction tube 120 just before opening a first gate valve 222 after the process is completed. Among various gas element analysis apparatuses, Residual Gas Analysis (RGA) may be used to detect a gas because it need not continue to suck a gas therein. Unfortunately, use of the RGA causes price competitiveness to be lowered due to its high price.

The detection controller 178 controls the first gate valve 222 according to the concentration value of the residual gas detected by the gas detector 172. For example, when the concentration value of hydrogen in the residual gas detected by the detector 172 is larger than a predetermined value, the detection controller 178 maintains a close state of the first gate valve 222. Meanwhile, when it is lower than the predetermined value, the detection controller 178 unlocks the close state of the first gate valve 222 to conduct the next step.

The gas exhaust unit 180 is provided to exhaust a gas inside the reaction tube 120. The gas exhaust unit 180 includes a gas exhaust duct 184, a man exhaust line 185 connected to the gas exhaust duct 184, a first exhaust line (hereinafter referred to as "ventilation exhaust line") 186, and a second exhaust line (hereinafter referred to as "vacuum exhaust line") 187. The ventilation exhaust line 186 and the vacuum exhaust line 187 branch from the main exhaust line 185. The gas exhaust duct 184 is installed at the flange 184. First and second valves 186*a* and 187*a* are installed at the ventilation exhaust line 186 and the vacuum exhaust line 186, respectively. The first and second valves 186*a* and 187*a* are selectively opened or closed by an exhaust controller 189.

The heat blocking member 190 is provided to prevent scale-up of the system 1 and protect the first valve 222 from the damage caused by radiant heat. Namely, in a case where the first gate valve 222 is disposed adjacent to the reaction chamber 100, an O-ring provided for a valve may be damaged due to a radiant heat inside the reaction chamber 100. For this reason, a distance between the heating unit 140 and the first gate valve 222 is sufficiently maintained by making the reaction chamber 100 long enough. However, increase in length of the reaction chamber 100 results in scale-up of the system 1. Accordingly, the heat blocking member 190 is installed between the first gate valve 222 and the reaction chamber 100 to block a radiant heat generated from the reaction camber 100 from migrating to the first gate valve 222. The heat blocking member 190 may be a blocking plate made of a low thermal conductivity material such as alumina. In a case where the blocking plate is made of a typical metal, a cooling water supply is provided around the metallic blocking plate to enhance a thermal deformation and a blocking efficiency of the metallic blocking plate. While the first gate valve 222 is closed, the heat blocking member 190 is disposed in front of the first gate valve 222. While the first gate valve 222 is opened, the heating blocking member 190 shifts to a position not to block a travel passage of a composite substrate 10.

While a reaction chamber 100 with the configuration adopting pyrolysis of hydrocarbon has been described in this embodiment, an apparatus 1 for compounding carbon nanotubes according to the present invention may employ any reaction chamber adopting a variety of methods such as laser deposition, plasma chemical vapor deposition, thermochemical vapor deposition, and frame composition.

The station part 200 is provided to prevent a composite substrate 10 unloaded from a reaction chamber 100 from exposing to the air. The station part 200 includes a chamber 200*a* isolated from the exterior. A first gate valve 222 is installed between the station part 200 and the reaction chamber 100 to open or close a travel passage of a composite substrate 10 between the reaction chamber 100 and the station part 200. A second gate valve 224 is installed between the station part 200 and the second transporter 700 to open or close a travel passage of the composite substrate 10 between the station part 200 and the second transporter 700.

The station part 200 includes a gas supply member 280 that is provided to a first area 240 for supplying an inert gas, such as nitrogen or argon, into the station part 200. An inert gas is supplied into the station part 200 during a process to eliminate the gas (especially air) inside the station part 200 and maintain the interior of the station part 200 at an inert gas ambient. This is aimed at preventing a high-temperature carbon nanotube 30 on a composite substrate from contacting oxygen when the composite substrate 10 is unloaded from the reaction chamber 100 inside the station part 200.

Figure 8:
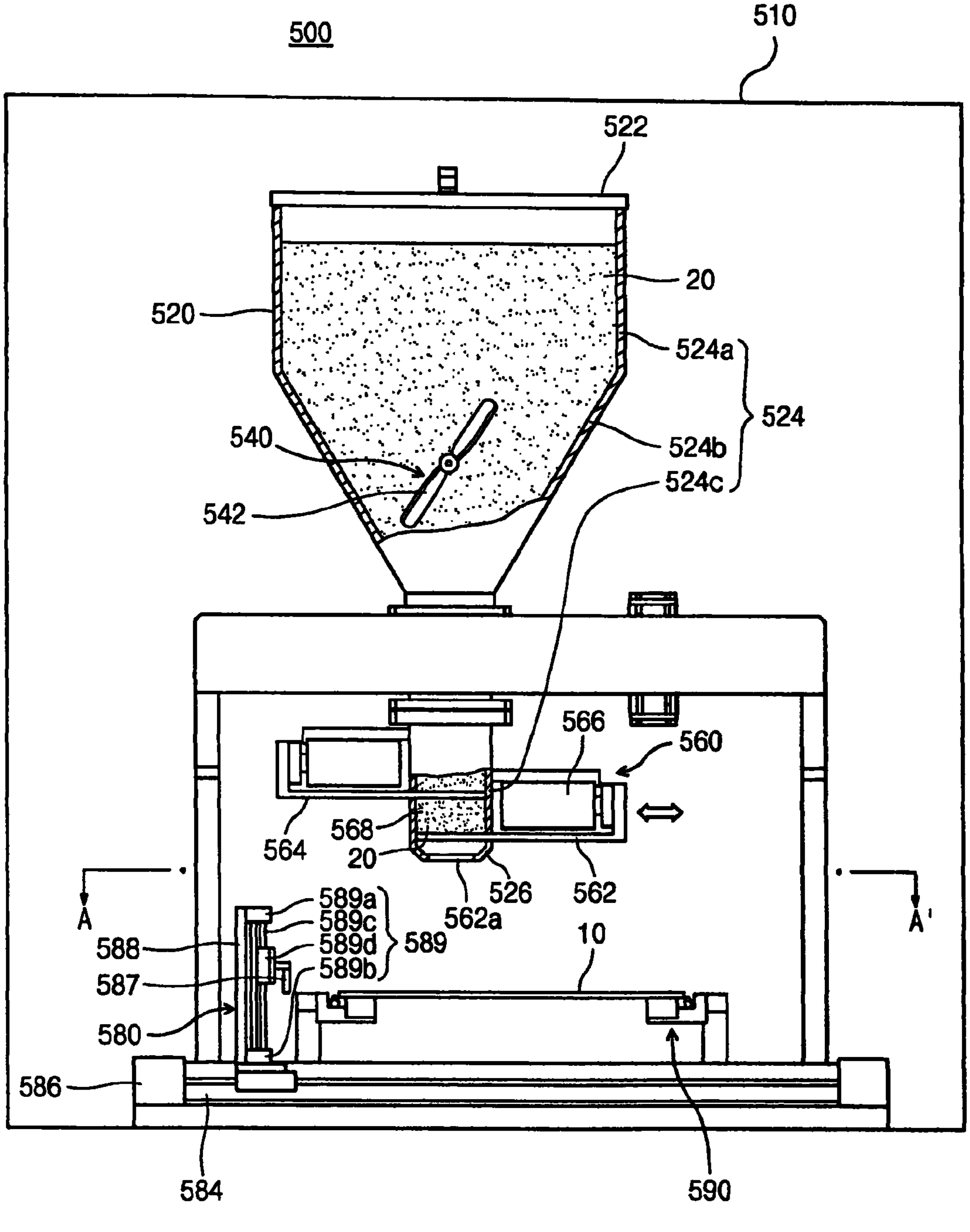
FIG. 8 illustrates the configuration of a catalyst coating unit illustrated in FIG. 1.

Now, the catalyst coating part 500 will be described in detail below. FIG. 8 is a configuration diagram of the catalyst coating part 500 illustrated in FIG. 1, and FIG. 9 is a top plan view of a cross-sectional view taken along a line A-A' of FIG. 8.

Figure 9:
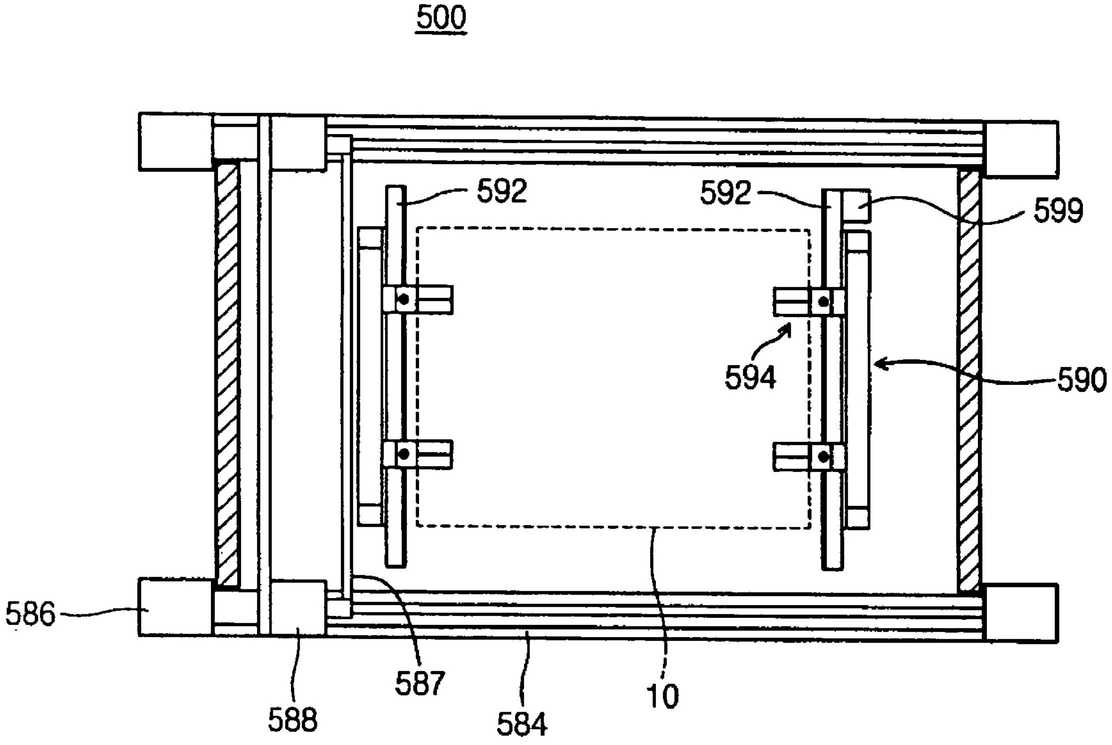
FIG. 9 is a top plan view taken along a line A-A' of FIG. 8.

Referring to FIG. 8 and FIG. 9, the catalyst coating part 500 is provided to coat a catalyst (metal layer) 20 on the top surface of a composite substrate 10 before the composite substrate 10 is loaded on a reaction chamber 120. Side plates 592 are disposed to face each other and spaced apart from each other such that the composite substrate 10 is disposed between stages 590. Support protrusions 594 are installed to protrude inwardly toward each of the side plates 592, supporting an edge portion of the composite substrate 10. A plurality of support protrusions 594 may be provided for each of the side plates 592.

A catalyst supply part 520 includes a catalyst storage tank 521 and a fix-amount supply unit 560. The catalyst storage tank 521 has at least one outlet 526*a* disposed over the stage 590 to supply a regular amount of catalyst 20 to the top surface of the composite substrate 10. A brush unit 580 is provided to conformally straighten the catalyst coated on the top surface of the composite substrate 10.

The brush unit 580 includes a guide rail 584, a coating brush 587, and a movable body 588. The guide rail 584 is installed lengthwise at both sides of the stage 590 on which the composite substrate 10 is loaded. The movable body 588 is movably installed at the guide rail 584 and moves linearly by means of a linear moving driver 586. The linear movement of the movable body 588 is done using a conventional driving method such as a linear motor driving method, a cylinder driving method, and a motor driving method. The coating brush 587 is disposed over the stage 590 to conformally straight a catalyst on an entire surface of the composite substrate 10. The coating brush 587 is disposed to be spaced apart from the stage 590. A space between the coating brush 587 and the stage 590 is equal to a catalyst coating thickness. Opposite sides of the coating brush 587 are connected to the movable body 588, enabling the coating brush 587 to slidably travel with the movable body 588. The coating brush 587 may be provided with the shape of a plate having a specific slant side to a forward direction. The coating brush 587 may be installed to adjust its height over the movable body 588 according to the coating thickness. The adjustment of the heights of the coating brush 587 may be done by means of a vertical movement unit 589.

The vertical movement unit 589 includes a top plate 589*a*, a bottom plate 589*b*, and a guide axis 589*c*. The top plate 589*a* is fixedly coupled with the upper end of the movable body 588, and the bottom plate 589*b* is fixedly coupled with the lower end of the movable body 588 to face the top plate 589*a*. The guide axis 589*c* is perpendicularly disposed to connect the top and bottom plates 589*a* and 589*b* with each other. A bracket 589*d* is installed at the guide axis 589*c*. The bracket 589*d* travels linearly up and down along the guide axis 589*c* by means of a conventional driver (not shown). The coating brush 587 is fixedly coupled with the bracket 589*d*.

The catalyst storage tank 521 is provided to supply a catalyst 20 stored therein onto a composite substrate 10. The catalyst storage tank 521 has a cover-type top surface 522, a lateral surface 524, and a bottom surface where an outlet 526*a* is formed. The lateral surface 524 includes a top lateral portion 524*a*, an intermediate lateral portion 524*b*, and a bottom lateral portion 524*c*. The top lateral portion 524*a* takes a perpendicular shape, and the intermediate lateral portion 524*b* extends downwardly from the top lateral portion 524*a* and is inwardly bent down. The bottom lateral portion 524*c* extends perpendicularly downwardly from the intermediate lateral portion 524*b* and has a narrow passage. Due to the foregoing configuration, a larger amount of catalyst 20 is stored in a space defined by the top lateral portion 524*a* than in a space defined by the bottom lateral portion 524*c*. Due to the shape of the intermediate lateral portion 524*b*, the catalyst 20 inside the space defined by the top lateral portion 524*a* is smoothly supplied to the space defined by the bottom lateral portion 524*c*.

The fixed-amount supply 560 is installed at the catalyst storage tank 521 for supplying the fixed amount of catalyst 20 to the top surface of the composite substrate 10. The fixed-amount supply unit 560 includes a top blocking plate 564 and a bottom blocking plate 562 that are configured for defining a fixed-amount space 568 into which a fixed amount of catalyst 20 is dipped. The top and bottom blocking plates 564 and 562 are provided to the bottom portion 524*c*. The fixed-amount space 568 is disposed over the outlet 526*a* of the catalyst storage tank 521. The top blocking plate 564 is provided over the fixed-amount space 568, and the bottom blocking plate 562 is provided therebelow. The top and bottom blocking plates 564 and 562 operate by driving means such as a cylinder 566. When the top blocking plate 564 is closed while the bottom blocking plate 562 is closed, a fixed-amount space 568 is filled with the set-amount of catalyst 20 between the bottom and top blocking plates 562 and 564. When the bottom blocking plate 562 is opened, the catalyst 20 dipped in the fixed-amount space 568 is supplied to the top surface of the composite substrate 10 through the outlet 526*a*.

An agitator 540 is installed at the intermediate lateral portion 542*b* of the catalyst storage tank 520 for agitating the catalyst 20. The agitator 540 includes at least one agitation wing 542 that rotates before supplying the catalyst 20 to the fixed-amount space 568 to eliminate a vacant space inside the catalyst storage tank 520 and induce the catalyst 20 to be supplied naturally to the fixed-amount space 568.

Figure 11:
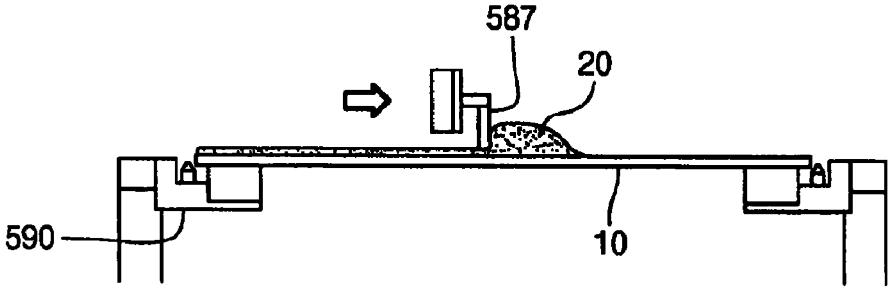
Figure 12:
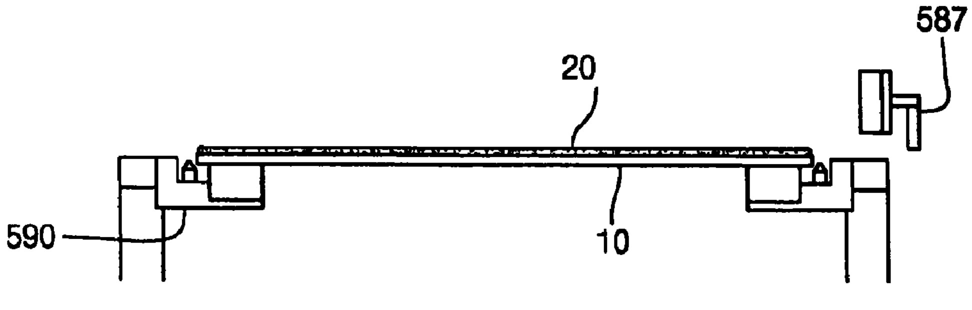

The catalyst coating steps of the catalyst coating part 500 will now be described with reference to FIG. 10 through FIG. 12.

Figure 10:
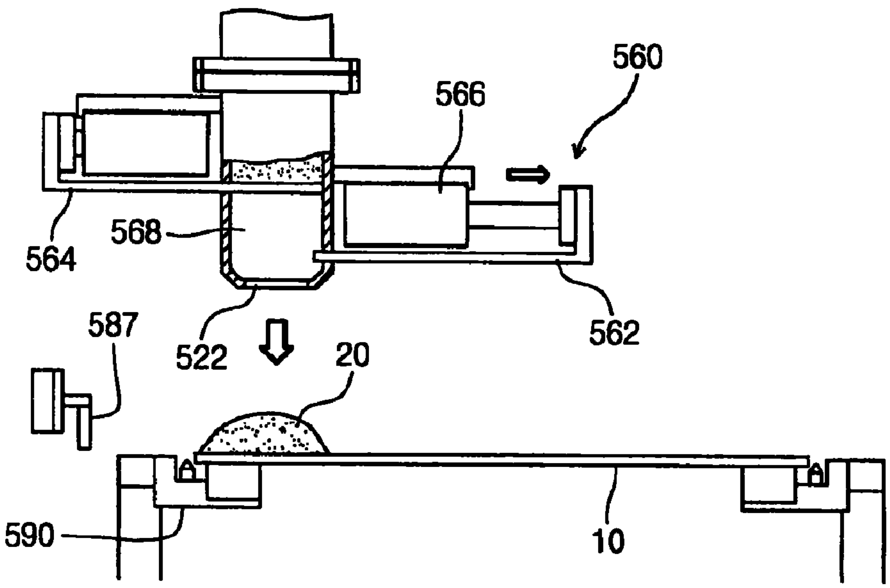
FIG. 10 through FIG. 12 illustrate steps of coating a catalyst at a catalyst coating unit.

Referring to FIG. 10, when a composite substrate 10 is loaded on a stage 590 by a second transporter 700, a bottom blocking plate 562 operates by a cylinder 566 to open the bottom of a fixed-amount space 568 while traveling in a side direction. The set-amount of catalyst 20 dipped in the fixed-amount space 568 drops on a top surface of the composite substrate 10. An entire surface of the composite substrate 10 is coated with the catalyst 20 accumulated on the top surface of the substrate 10 by means of a brush unit 580. That is, a coating brush 587 enables the entire surface of the composite substrate 10 to be conformally coated with the catalyst 20 while slidably traveling from one end of the composite substrate 10 to the other end thereof. A vibrator 599 such as a vibration motor may additionally be provided for conformal coating of the catalyst. The vibrator 599 is installed at the spot where a vibration is applied to the coating brush 587 or the composite substrate 10. In this embodiment, the vibrator 599 is installed on a side plate 592 of the stage 590. The vibration generated from the vibrator 599 is transmitted to a composite substrate through support protrusions 594.

The catalyst 20 may be a powder made by mixing a transition metal (e.g., iron, platinum, cobalt, nickel, yttrium or combination thereof) with a porous substance (e.g., MgO, $Al_2O_3$ or $SiO_2$). Alternatively, the catalyst 20 may be a liquid catalyst including the above-mentioned substances.

Figure 13:
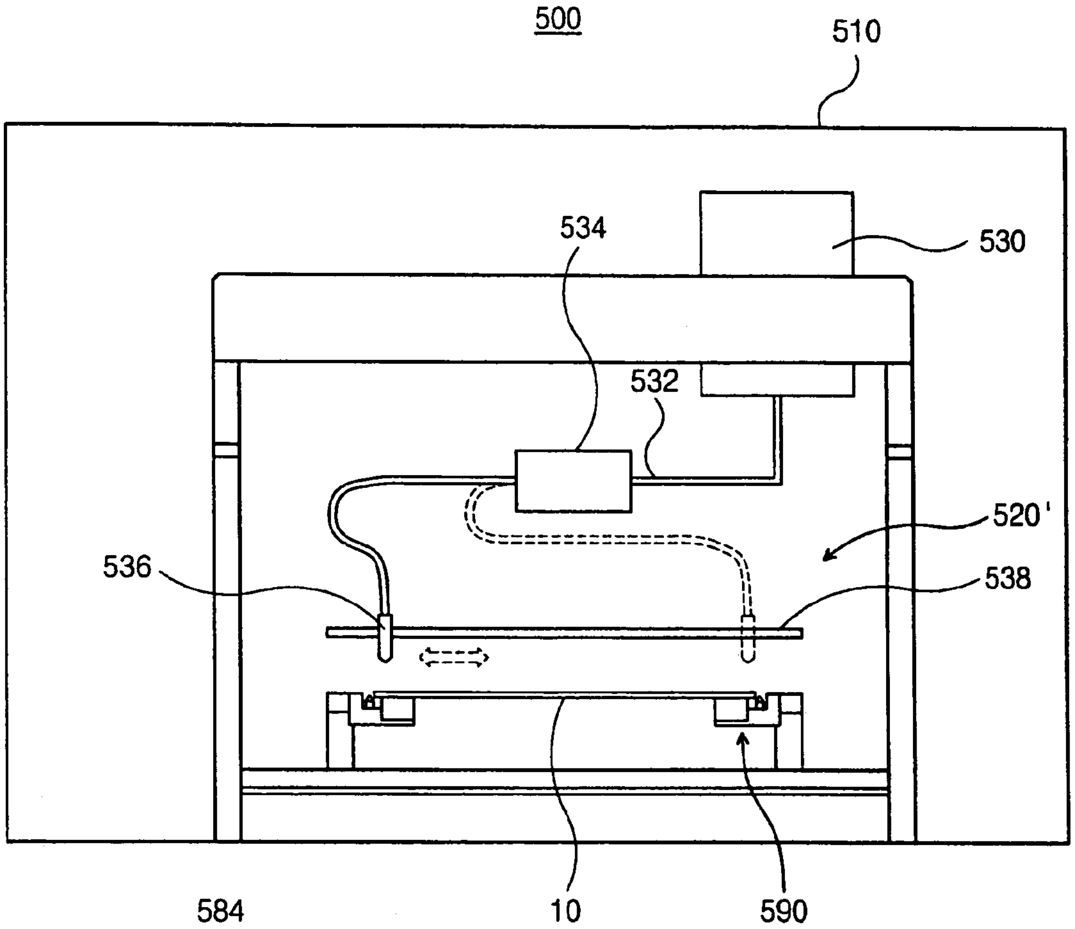
FIG. 13 illustrates the configuration of a catalyst coating unit to explain a modified catalyst coating unit.

In a case where the catalyst 20 is a liquid catalyst, another type of a catalyst supply part is required. Referring to FIG. 13, a catalyst supply part 520' includes a storage tank 530, a supply line 532, and a fixed-amount supply pump 534 installed on the supply line 532, an a supply nozzle 536 configured to supply a liquid catalyst 20 to a top surface of a composite substrate. The supply nozzle 536 may be a slit-type nozzle having a length that is equivalent to a width of a composite substrate 10. The supply nozzle 536 is configured to conformally coat a catalyst on the composite substrate 10 while traveling from one side to the other side of the composite substrate 10 along a guide rail 538. Since the conformal coating of the catalyst is done by means of the supply nozzle 536, a brush unit may be omitted.

As described above, a coating brush 587 is provided to conformally coat a catalyst 20 on a composite substrate 10 while traveling. Alternatively, a stage may travel while a coating brush 587 is fixed. Preferably, a coating brush 587 travels to reduce a space of a catalyst coating part 500.

As described above, a catalyst 20 is independently coated on a composite substrate 10 at the catalyst coating part 500 and a carbon nanotube 30 is produced on the composite substrate 10 coated with the catalyst 20 in the reaction chamber 100. Alternatively, following the removal of a catalyst coating part, a catalyst gas and a source gas are supplied inside a reaction chamber 100 to coat a catalyst on a composite substrate and produce a carbon nanotube.

Figure 14:
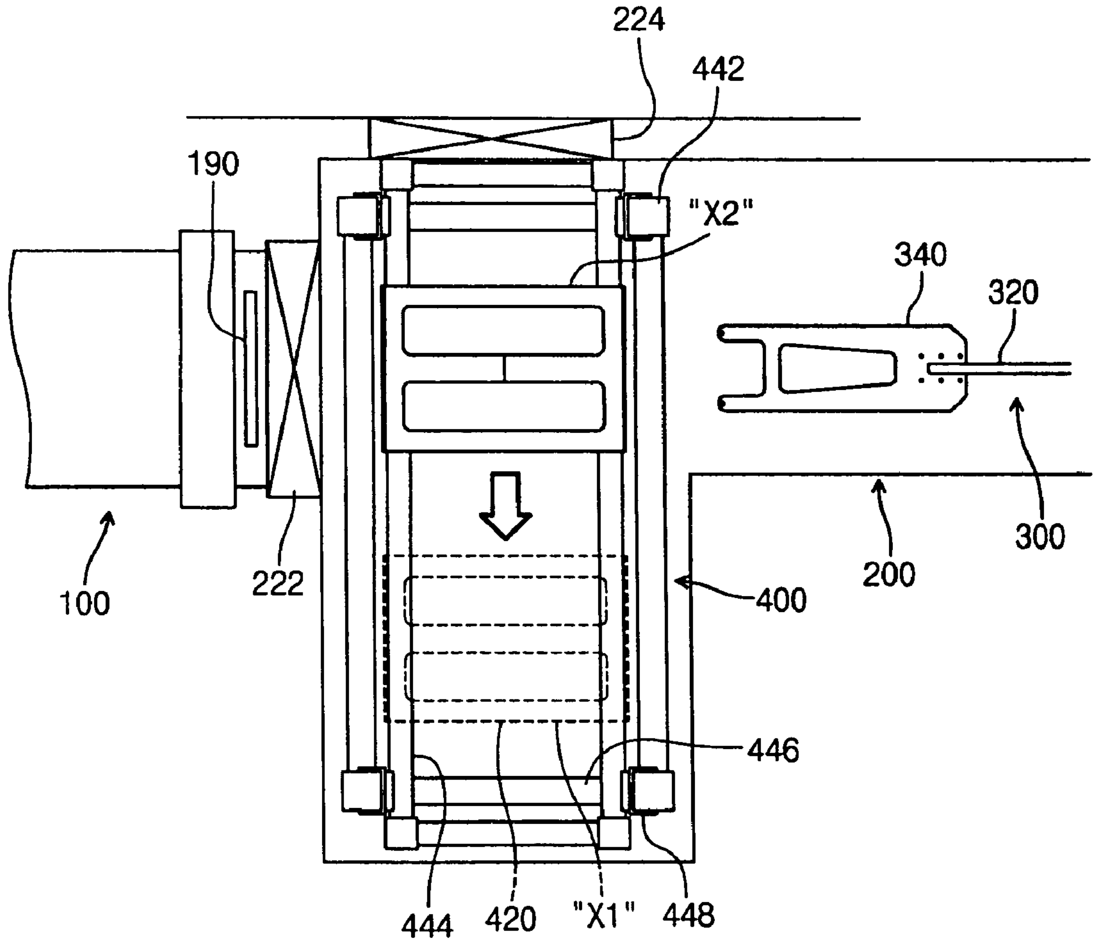
FIG. 14 is a top plan view of a substrate accommodating part and a fist transporter illustrated in FIG. 1.
Figure 15:
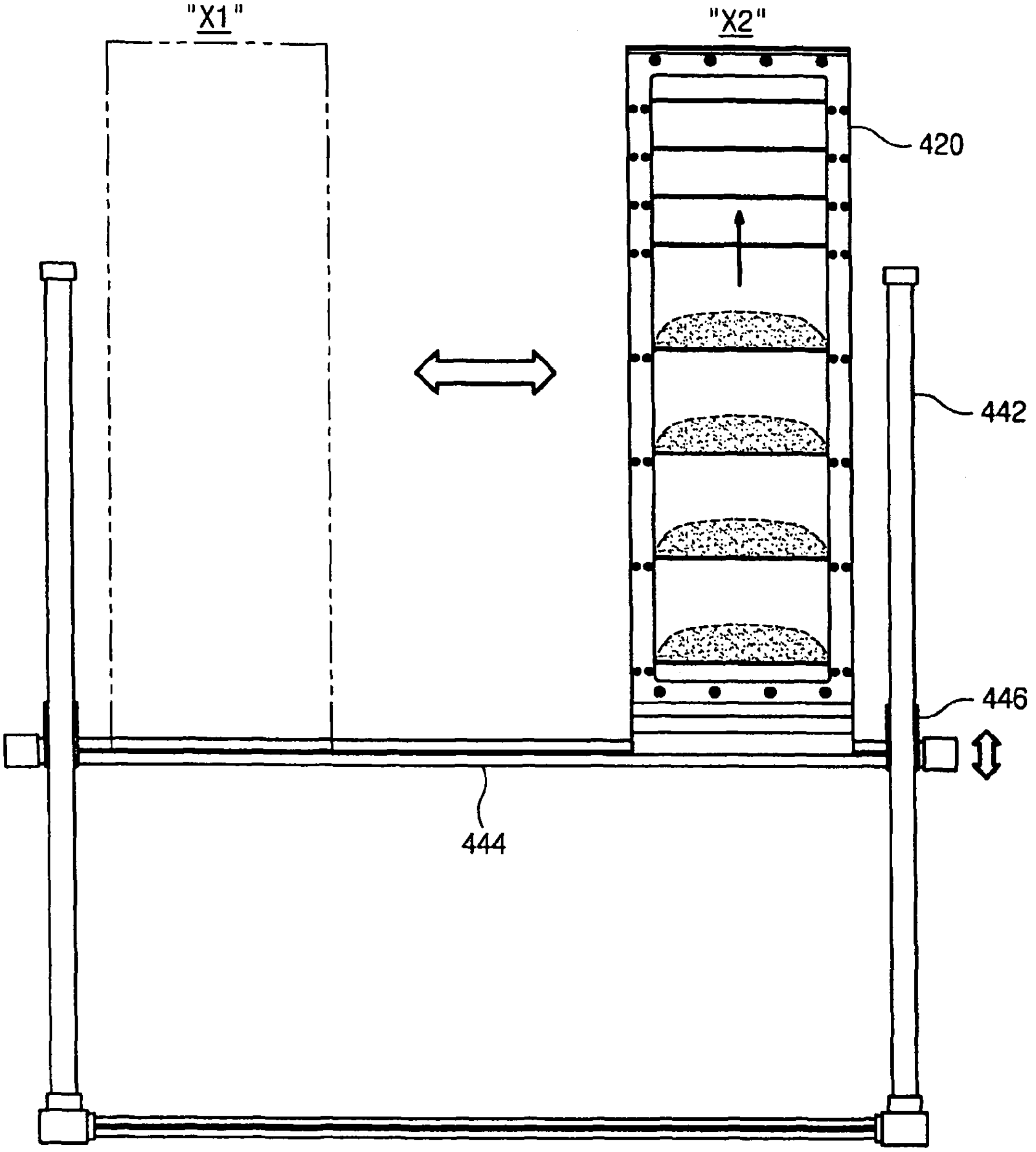
FIG. 15 is a side view of a substrate accommodating unit.

FIG. 14 is a top plan view of the substrate accommodating part 400 and the first transporter 300, and FIG. 15 is a side view of the substrate accommodating part 400. The substrate accommodating part 400 includes a cassette 420 configured for accommodating a composite substrate 10, vertical rails 442, a horizontal rail 444, and movable frames 446. The vertical rails 442 are disposed at corners of a first area 240, respectively. Each of the vertical rails 442 takes a shape of a perpendicularly long rod for guiding an up-and-down movement of the movable frame 446. A bracket 448 is coupled with the respective vertical rails 442 and travels up and down along the vertical rail 442 by a vertical driver (not shown). The respective movable frames 446 are provided lengthwise in a first direction 42 and are disposed to face each other. The movable frame 446 gears with the bracket 448 to linearly travel up and down along the vertical rail 442 with the bracket 448. The horizontal rail 444 is fixedly installed on the movable frame 446. The respective horizontal rails 444 is provided lengthwise in a second direction 44 and disposed to face each other. The horizontal rail 444 is provided throughout the first area 240. The cassette 420 is mounted on the horizontal rail 444 to be movable along the horizontal rail 444 in the second direction 44.

As illustrated in FIG. 14, the cassette 420 travels horizontally between a wait position X1 denoted by a dotted line and a loading/unloading position X2 denoted by a solid line. The wait position X1 exists in a bottom area 244 of the first area 240, and the loading/unloading position X2 exists in a top area 242 thereof. The cassette 420 travels to the loading/unloading position X2 when the composite substrate 10 is loaded/unloaded to/from the reaction chamber 100 and when the composite substrate 10 is transported by the second transporter 700. Also the cassette 420 travels to the wait position X1 when waiting to drop a temperature of the composite substrate 10.

Figure 16:
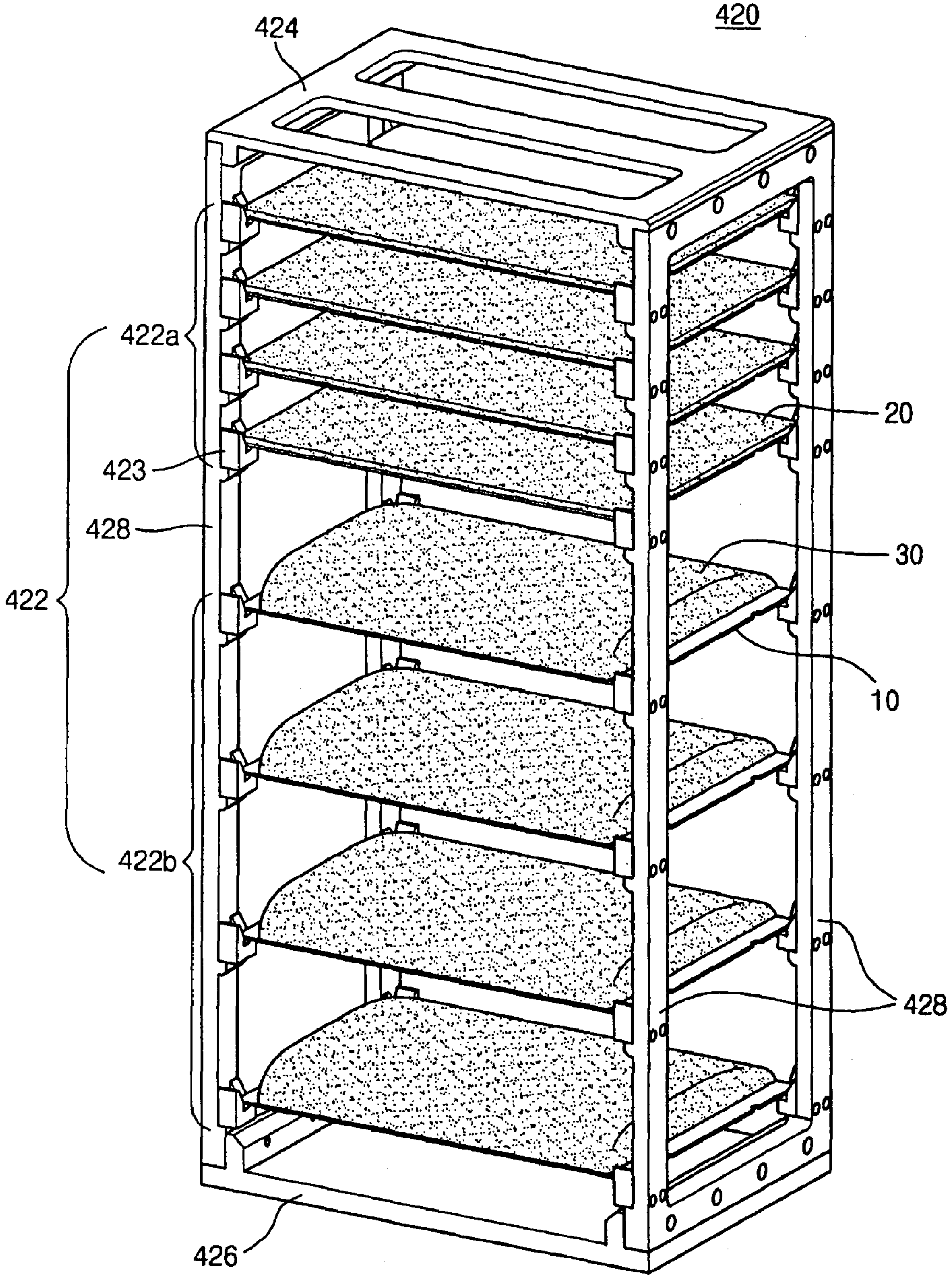
FIG. 16 is a perspective view of a cassette of a substrate accommodating part.

FIG. 16 is a perspective view of the cassette 420. The cassette 420 is provided to accommodate a composite substrate 10 to be loaded to a reaction chamber 100 and composite substrates 10 unloaded from the reaction chamber 100. Referring to FIG. 16, the cassette 420 includes supports 422, a top plate 424, a bottom plate 426, and vertical axes 428. The top and bottom plates 424 and 426 are rectangular plates facing each other. The vertical axes 428 connect corresponding corners of the top and bottom plates 424 and 426 with each other. Accordingly, four vertical axes 428 are provided. The supports 422 are installed at the vertical axes 428 to accumulate and accommodate the composite substrates 10 in the cassette 420. Each of the supports 422 has four supporting blocks 423 for supporting corner portions of the composite substrate 10. The supports 422 are segmented into two groups with a first group including first supports 422*a* and a second group including second supports 422*b*. The first supports 422*a* support the composite substrates 10 to be loaded to the reaction chamber 10, and the second supports 422*b* support composite substrates 10 unloaded from the reaction chamber 10. In an exemplary embodiment, four first support 422*a* and four second support 422*b* are provided and the first supports 422*a* is disposed over the second supports 422*b*.

A space between the second supports 422*b* is larger than that between the first supports 422*a*. The foregoing configuration makes it possible to reduce an overall height of the cassette 420 and define a space wide enough to prevent a carbon nanotube (CNT) 30 produced on the composite substrate 10 from contacting an adjacent composite substrate 10.

The first transporter 300 is provided to load the composite substrates 10 accommodated at the first support 422*a* of the cassette 420 into the reaction chamber 100. Four composite substrates 10 are loaded on a boat 160 of the reaction chamber 100. The first transporter 300 loads/unloads composite substrates to/from the reaction chamber 100 one after another. If loading the composite substrates 10 is completed, a process is performed inside the reaction chamber 100 for producing a carbon nanotube 30. During the process, other four composite substrates 10 wait at the first supports 422*a* of the cassette 420 after being coated with a catalyst. If the process for producing a carbon nanotube 30 is completed inside the reaction chamber 100, a high-temperature composite substrate 10 is unloaded from the reaction chamber 100 by the first transporter 300 to be accommodated at the second support 422*b* of the cassette. The high-temperature composite substrate 10 is cooled at the second support 422*b* for a predetermined time. Cooling the high-temperature composite substrate 10 is conducted by means of natural cooling. Alternatively, the cooling may forcibly be conducted using cooling means such as cooling water. When the composite substrates 10 where the production of carbon nanotubes 30 is completed are fast drawn out of the reaction chamber 100 (without being cooled by a predetermined temperature), four composite substrates 10 waiting at the first support 422*a* of the cassette 420 (to produce a carbon nanotube 30) are loaded to the reaction chamber 100. Likewise in the reaction chamber 100, while a temperature of a reaction tube 120 is maintained at a process temperature, composite substrates 10 are fast loaded to omit a step of raising the reaction tube 120 up to the process temperature.

The composite substrates where the carbon nanotubes 30 are produced wait at the second supports 422*b* of the cassette 420 until dropping below a predetermined temperature. The cassette 420 at which the composite substrates 10 wait are disposed inside a station part 200. Since the interior of the station part 200 is filled with inert gas, the composite substrates 10 waiting at the cassette 10 are not in contact with external air (especially oxygen). If a high-temperature composite substrate 10 is exposed to the air of room temperature, the carbon nanotube 30 produced on a surface of the composite substrate 10 reacts to oxygen of the air to be deformed. Thus, the interior of the station part 200 is filled with inert gas to prevent the composite substrates 10 unloaded from the reaction chamber 10 from contacting the oxygen.

The composite substrates 10 waiting at the second supports 422*b* of the cassette 420 for a predetermined time are transported to a retrieve part 600 by a second transporter 700 through a second gate valve 224. The retrieved composite substrate 10 is re-accommodated at the first support 422*a* of the cassette 420 after being coated with a catalyst 20 at a catalyst coating part 500. According to the CNT compounding apparatus 1, total eight composite substrates are classified into two groups and process of compounding carbon nanotubes 30 are successively performed inside a reaction chamber for the two groups one after another. Thus, the process amount is increased to achieve a massive production of carbon nanotubes.

Figure 17:
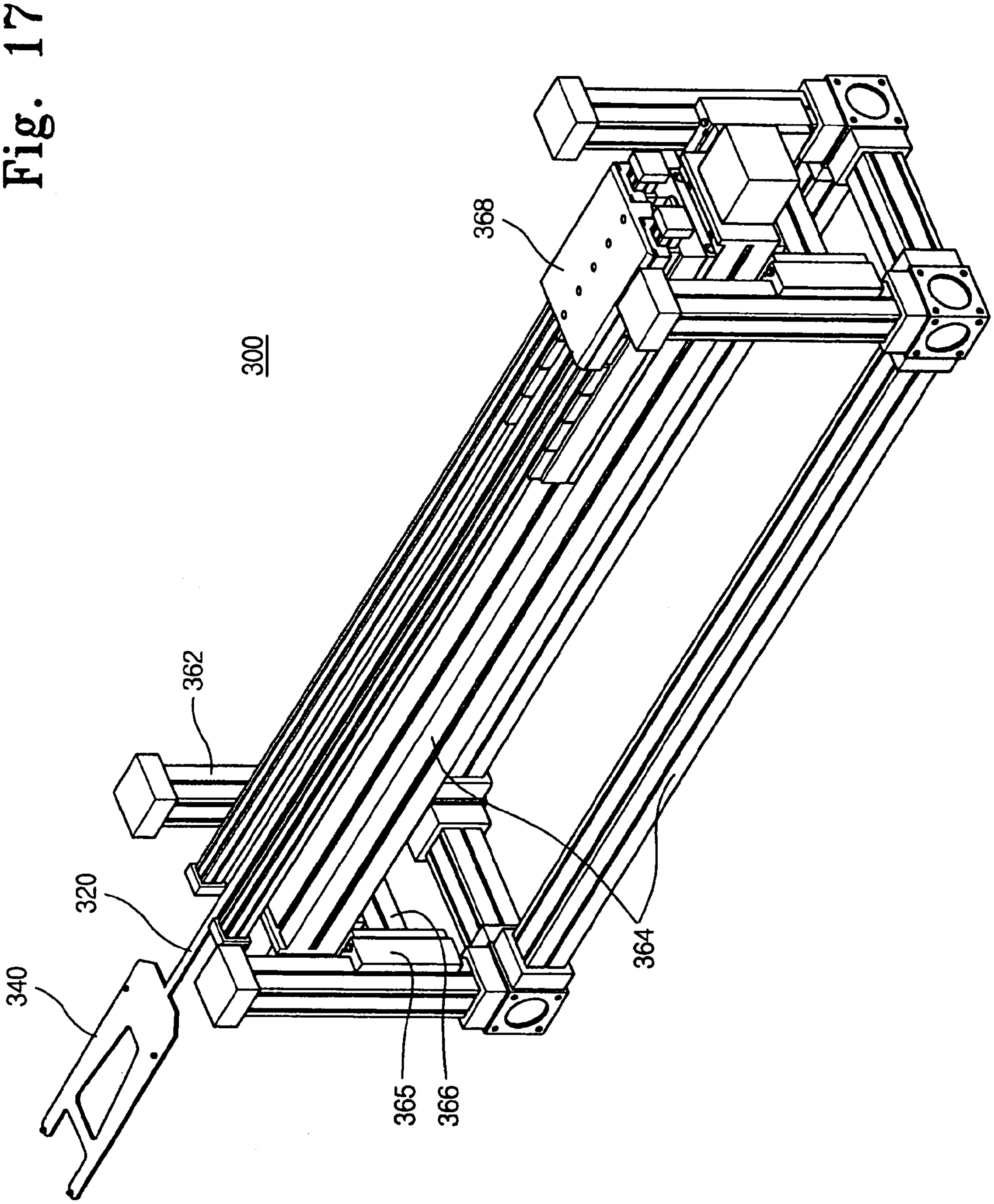
FIG. 17 is a perspective view of a first transporter.

FIG. 17 is a perspective view of a first transporter 300. The first transporter 300 includes an arm 320, a blade 340, and a driver 360. The driver 360 includes vertical rails 362, a horizontal rail 364, movable frames 366, and a movable block 368. The vertical rails 362 are disposed at corner portions of a second area 260, respectively. Each of the vertical rails 362 takes a shape of a lengthwise-long rod to guide an up-down movement of the movable frame 366. A bracket 365 is coupled with each of the vertical rails 362 and travels up and down by means of a vertical driver (not shown). The movable frames 366 are provided long in a second direction 44 to face each other. The movable frame 366 gears with the bracket 365 to linearly move up and down along the vertical rail 362 with the bracket 365. Each of the movable frames 366 has both ends that are fixedly installed at the facing brackets 365 in the second direction 44, and the movables frames 366 moves up and down with the bracket 365. The horizontal rail 364 is fixedly installed over the movables frames 366. Each of the horizontal rails 364 is provided long in a first direction 42. The horizontal rail 364 is provided throughout the second area 260, and the movable block 368 is mounted on the horizontal rail 364 to be movable along the horizontal rail 364 in the second direction 44. The arm 320 is fixedly installed at the movable block 368 and provided long in the first direction. The blade 340 is installed at the end of the arm 320 for supporting the composite substrate 10. Composite substrates 10 cooled for a predetermined time are transported to the retrieve part 600 through the second valve 224 by means of the second transporter 700.

Figure 18:
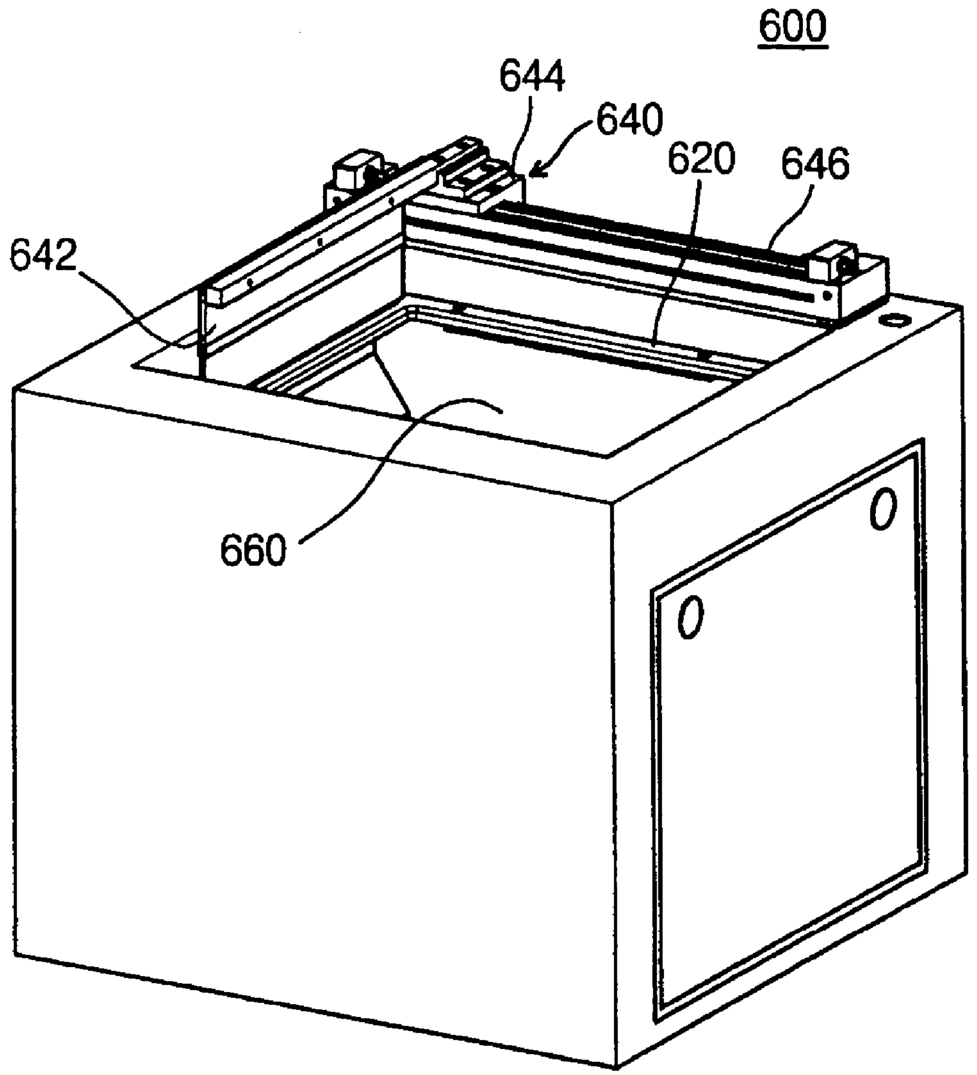
FIG. 18 is a perspective view of a retrieve part illustrated in FIG. 1.
Figure 19:
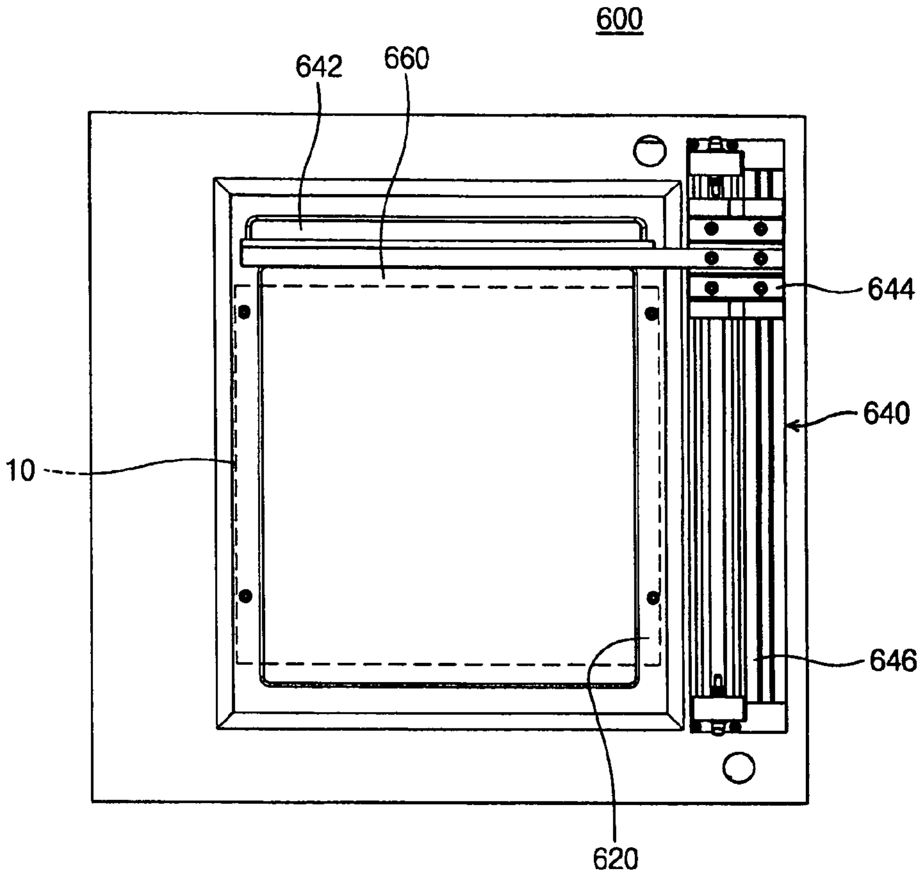
FIG. 19 is a top plan view of a retrieve part illustrated in FIG. 11.
Figure 20:
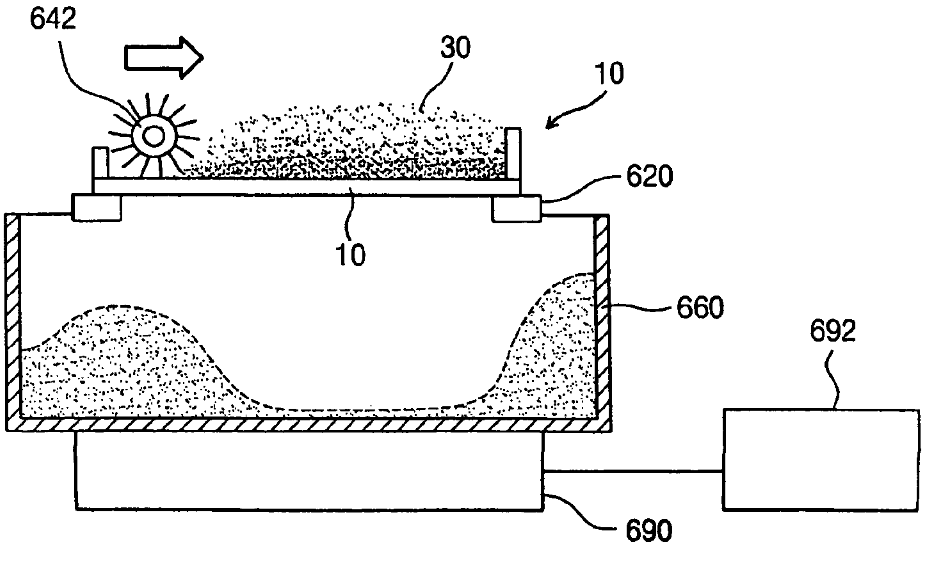
FIG. 20 illustrates steps of retrieving a carbon nanotube at a retrieve part.

FIG. 18 and FIG. 19 are a perspective view and a top plan view of a retrieve part 600, respectively. FIG. 20 is a diagram illustrating a retrieve procedure of a carbon nanotube 30 in a retrieve part.

Referring to FIG. 18 and FIG. 19, the retrieve part 600 includes a case 602 having an open top surface. A stage 620 is disposed on the case 602. A composite substrate 10 is loaded on the stage 620. Beneath the stage 620 (beneath the open top surface of the case 602), a container 660 is disposed in which a carbon nanotube 30 retrieved from a composite substrate 10 is contained. A retrieve unit 640 is disposed at the stage 620 for brushing the carbon nanotube 30 to the retrieve container 660 from a top surface of the composite substrate 10. The retrieve unit 640 is provided with a guide rail 646 installed in a length direction of the composite substrate 10. A movable body 644 is installed at the guide rail 646. A retrieve brush 642 is installed at the movable body 644 and may be made of normal metal/plastic. The retrieve brush 642 is provided for brushing the carbon nanotube 30 on the top surface of the composite substrate 10 to the retrieve container 660 while slidably traveling from one side of the composite substrate 10 in a length direction. Since the composite substrate 10 takes the shape of a fence 12, the retrieve brush 642 is configured to be rotatable. That is, the retrieve brush 642 is generally a cylindrical brush and rotates while contacting a carbon nanotube 30 compounded on a composite substrate 10 to brush the carbon nanotube 30. A height of the retrieve brush 642 is controllable at the movable body 644. An electronic scale 690 may be installed at the bottom surface of the retrieve container 660 for measuring a weight of a carbon nanotube retrieved to the retrieve container 660. Values measured by the electronic scale 690 include an accumulated amount and a currently retrieved amount which are displayed on a monitor 692 installed at the outside. By watching the values displayed on the monitor 692, an operator may compute an accurate production.

As described above, a retrieve brush 642 brushes a catalyst 20 on a composite substrate 10 while traveling. Alternatively, a stage may travel while the retrieve brush 642 is fixed. Preferably, a coating brush 587 travels to reduce a space of a catalyst coating part 500, as described in the above embodiment.

The composite substrate 10 where the carbon nanotube 30 is retrieved is provided to the catalyst coating part 500 by the second transporter 700 to be subjected to the above-described coating process. The composite substrate 10 coated with a catalyst is accommodated at the first support 422*a* of the cassette 420.

The steps of compounding a carbon nanotube 30 using the foregoing CNT compounding apparatus 1 will now be described in detail below.

Figure 21:
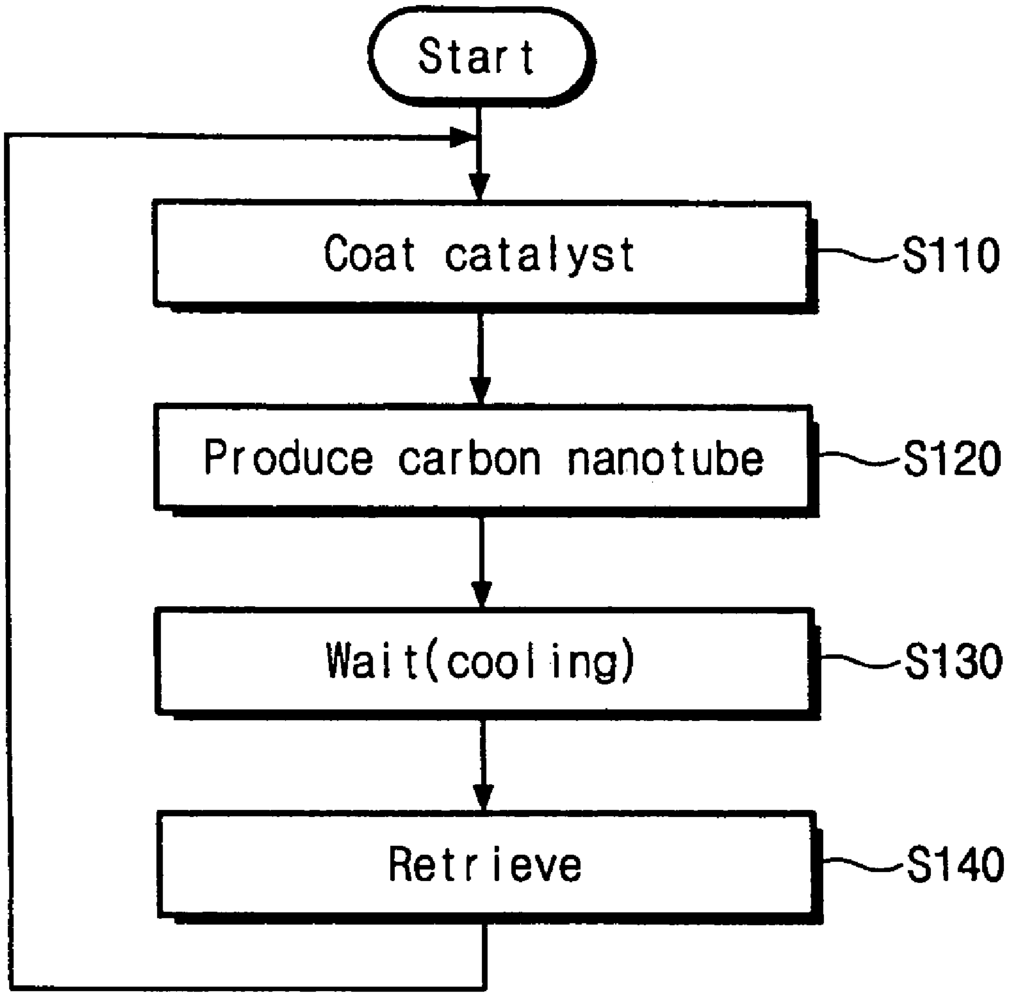
FIG. 21 is a flowchart illustrating a process performed by means of an apparatus for compounding carbon nanotubes according to the present invention.

FIG. 21 is a flowchart illustrating a process performed by means of an apparatus for compounding carbon nanotubes according to the present invention. Referring to FIG. 21, a process performed in a system for massive production of the above-described carbon nanotubes 30 includes a catalyst coating step S110, a carbon nanotube producing step S120, a waiting (cooling) step S130, and a retrieving step S140.

In the step S110, when a dose of catalyst 20 is applied to a top surface of a composite substrate 10 from a catalyst storage tank 521, a coating brush 587 of a brush unit 580 uniformly distributes the catalyst 20 to the top surface thereof while traveling. The composite substrate 10 coated with the catalyst 20 is accommodated in a cassette 420 of a substrate accommodating part 400 installed at a station part 200 by a second transporter 700. The composite substrate 10 accommodated at a first support 422*a* of the cassette 420 is loaded on a boat 160 of a reaction chamber 100 by a first transporter 300 shortly after the processed composite substrate 10 is unloaded from the reaction chamber 100. When loading the composite substrate 10 is completed, a process is performed inside the reaction chamber 100 to produce a carbon nanotube 30 (S120).

Figure 22:
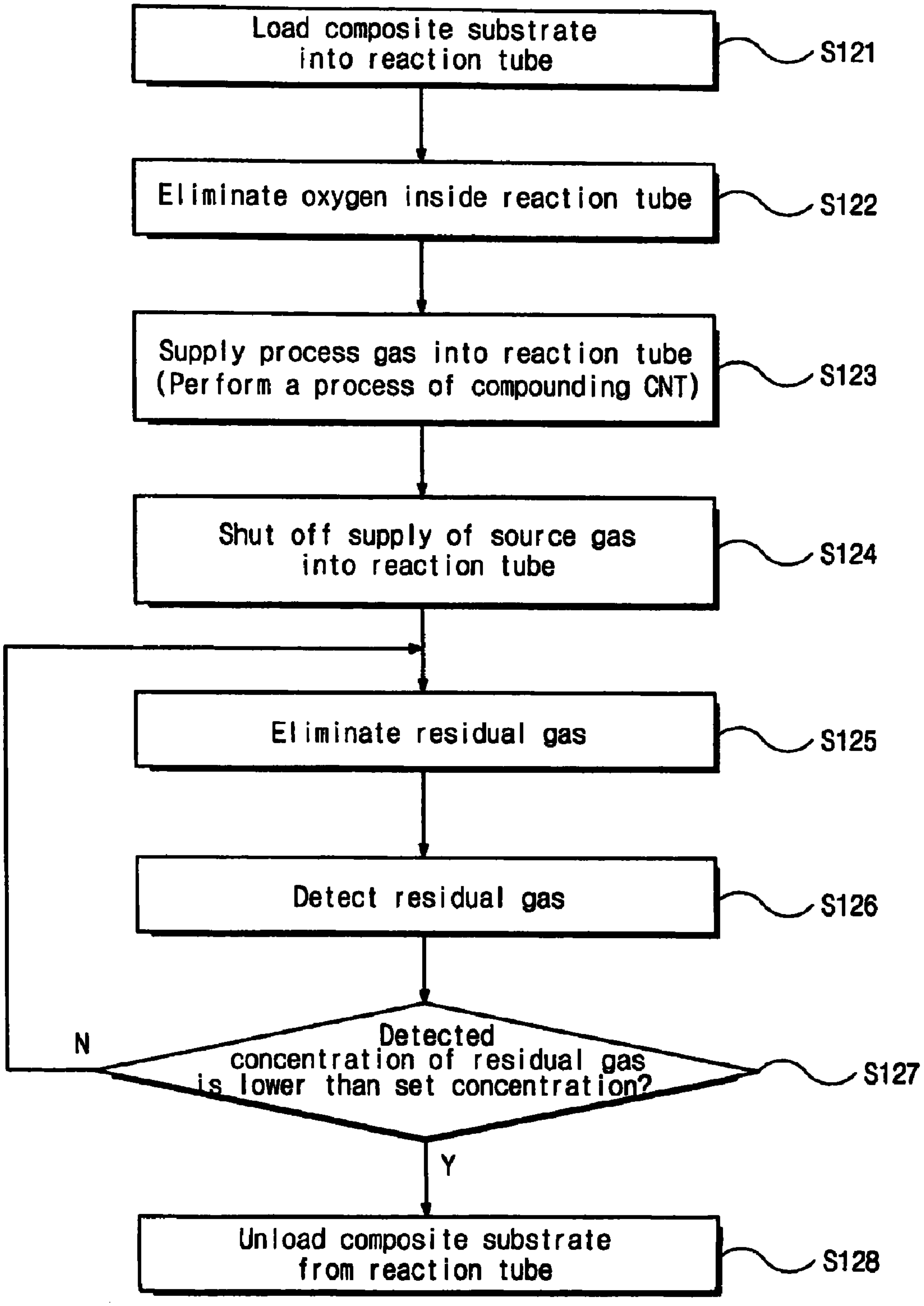
FIG. 22 is a flowchart illustrating a method for compounding carbon nanotubes according to the present invention.

Referring to FIG. 22, the step 120 will be now described in detail. When a composite substrate 10 is loaded on an inner space of a reaction tube 120 (S121), the reaction tube 120 is heated by means of a heating unit 140 to a process temperature (500-1100 degrees centigrade). It may take 20-25 minutes to heat the reaction tube 120 to the process temperature. While (or when) the reaction tube 120 is heated by means of the heating unit 140, a composite substrate is loaded on an inner space of the reaction tube 120. When composite substrates 10 are loaded on the reaction tube 120, oxygen inside the inner space of the reaction tube 120 is eliminated (S122). The elimination of the oxygen includes a first step and a second step. In the first step, a vacuum exhaust line 187 is shut off after the interior of the reaction tube 120 becomes vacuum (degree of vacuum: 10 Torr or less) by opening the vacuum exhaust line 187 (shutting off a ventilation exhaust line 186). In the second step, the ventilation exhaust line 186 is opened to exhaust an inert gas after the interior of the reaction tube 120 becomes atmospheric by supplying the inert gas into the reaction tube 120. The elimination of the oxygen may include only one step in which while the ventilation exhaust line 186 is opened, an inert gas is continuously supplied into the reaction tube 120 to exhaust oxygen inside the reaction tube 120 to the ventilation exhaust line 186. However, use of only one step is not capable of fully eliminating oxygen and causes a large amount of inert gas to be supplied.

When an inner temperature of the reaction tube 120 reaches a process temperature, a source gas is supplied to the inner space of the reaction tube 120 (S123). The source gas is decomposed into radicals, which react to a catalyst coated on the composite substrate 10 to compound a carbon nanotube. When compounding the carbon nanotube is completed in the reaction tube 120, supplying the source gas from a gas supply unit 150 is cut off (S124). Residual gas inside the reaction tube 120 is eliminated through a residual gas elimination step (S125). The residual gas elimination step includes forcibly exhausting a residual gas through a second exhaust line 187 to make the interior of the reaction tube 120 become vacuum and supplying an inert gas to make the interior of the reaction tube 120 become atmospheric. After detecting whether the residual gas exist inside the reaction tube 120 (S126), opening of the reaction tube 120 is controlled depending on whether the residual gas is detected (S127). In the event that a first gate valve 222 is opened without checking whether the residual gas exists, hydrogen of the residual gas may react to oxygen externally flowing into the reaction tube 120 to cause an explosion. Accordingly, safety is achieved by opening the reaction tube 120 after checking whether a concentration of nitrogen in the residual gas is lower than a set concentration. When the nitrogen concentration is detected to be higher than the set concentration, the residual gas elimination step is re-conducted. Afterwards when the nitrogen concentration is detected to be lower than the set concentration, the reaction tube 120 is opened to unload a composite substrate (S128).

After composite substrates 10 unloaded from the reaction chamber 100 are accommodated at a second support 422*b* of the cassette 420, they are cooled for a predetermined time (S130). After the predetermined time, the composite substrates 10 are drawn out of the station part 400 to be transported to the retrieve part 600 (S140). The composite substrates 10 retrieving the carbon nanotube 30 in a retrieve part 600 are transported to a catalyst coating part 500 to be accommodated at the first support 422*a* of the cassette 420 after being coated with the catalyst 20. The composite substrates 10 treated inside the reaction chamber 100 are repeatedly subjected to the above-mentioned processes after being accommodated at the second support 422*b* of the cassette 420.

As described so far, the present invention has advantages as follows: (1) it is possible to massively produce carbon nanotubes; (2) it is possible to uniformly supply a source gas to an overall reaction tube and enhance a use efficiency of the source gas; (3) since a process of a reaction chamber is continuously maintained, carbon nanotubes of a composite substrate are successively compounded to enhance a system operating rate; (4) a catalyst is supplied automatically precisely to enhance a process reliability; (5) a carbon nanotube is automatically retrieved to precisely compute a production; (6) in a case where a residual gas inside a reaction tube is detected to have a higher concentration than a set concentration, opening of the reaction tube is shut off beforehand to prevent the residual gas from leaking to the exterior; (7) it is possible to check whether a residual gas exists inside a reaction tube and a noxious gas is detected to have a higher than a set concentration; and (8) it is possible to prevent a carbon nanotube from dropping on the bottom of a reaction tube.

Although the present invention has been described in connection with the embodiment of the present invention illustrated in the accompanying drawings, it is not limited thereto. It will be apparent to those skilled in the art that various substitutions, modifications and changes may be made without departing from the scope and spirit of the invention.

What is claimed is:

1. An apparatus for compounding carbon nanotubes, comprising:

a reaction tube configured to define a production space in which carbon nanotubes are produced;

a heating unit configured to heat the reaction tube;

a boat, disposed in the production space during a process, on which composite substrates are loaded; and a gas supply part with a nozzle unit in the reaction tube configured to supply a source gas to the production space, the nozzle unit including injection parts, the ends of the injection parts being upwardly bent so as to be inclined with respect to a centerline of the reaction tube and being further configured to supply the source gas into the production space in a direction inclined from the centerline of the reaction tube, wherein the injection parts comprises a first injection part configured to supply a source gas at a higher position than the boat and a second injection part configured to supply a source gas at a lower position than the first injection part, and the boat includes multiple stages and multiple columns configured to support multiple composite substrates, the boat including multiple fence structures formed along the edges of respective composite substrates, each fence including a first sidewall arranged perpendicular to a source gas flow and having a first height, at least one second side wall arranged parallel to the source gas flow and having a second height, and a third sidewall arranged perpendicular to the source gas flow and having a third height higher than the first height and the second height.

2. The apparatus of claim 1, wherein the first injection part comprises at least one long nozzle formed lengthwise to be adjacent to the boat.

3. The apparatus of claim 2, wherein the second injection part includes at least one medium nozzle shorter than the long nozzle.

4. The apparatus of claim 1, further comprising:

a gas exhaust part configured to exhaust a source gas inside the reaction tube; and a residual gas detection unit configured to detect whether a residual gas exists inside the reaction tube and control unloading of a composite substrate from the reaction tube based on the detection result.

5. The apparatus of claim 4, wherein the residual gas detection unit comprises:

a gas detector in which a gas sensor is installed to detect a concentration of a residual gas exhausted from the reaction tube; and a detection controller configured to maintain or unlock a lock state of a control valve of the reaction tube according to a concentration value of the residual gas detected by means of the gas detector.

6. The apparatus of claim 5, wherein the gas detector comprises:

a first inflow port, connected with an exhaust line of the gas exhaust part, in which the gas exhausted through the exhaust line flows;

a second inflow port in which an external air flows; and a valve for selectively opening or closing the first and second inflow ports by means of the detection controller.

7. The apparatus of claim 6, wherein the detection controller controls the valve to open the first inflow port after the reaction tube in which a process of compounding a carbon nanotube is ended is purged by an inert gas.

8. The apparatus of claim 1, further comprising:

a gas exhaust part configured to exhaust a source gas inside the reaction tube, the gas exhaust part including a main exhaust line connected to the reaction tube, a ventilation exhaust line and a vacuum exhaust line branching from the main exhaust line, and an exhaust controller configured to selectively open or close the ventilation exhaust line and the vacuum exhaust line.

9. The apparatus of claim 1, wherein the boat includes n rows of composite substrates and the nozzle unit includes n injection parts, and n is an integer.

10. The apparatus of claim 9, wherein n=2.

11. The apparatus of claim 1, wherein the direction inclined from the centerline of the reaction tube is not perpendicular to the reaction tube.

* * * * *